US012605953B2

(12) United States Patent
Sugaya

(10) Patent No.: US 12,605,953 B2
(45) Date of Patent: Apr. 21, 2026

(54) INK JET RECORDING SYSTEM AND RECORDING METHOD

(71) Applicant: Konica Minolta, Inc., Tokyo (JP)

(72) Inventor: Toyoaki Sugaya, Hachioiji (JP)

(73) Assignee: KONICA MINOLTA, INC., Tokyo (JP)

( * ) Notice: Subject to any disclaimer, the term of this patent is extended or adjusted under 35 U.S.C. 154(b) by 207 days.

(21) Appl. No.: 18/449,041

(22) Filed: Aug. 14, 2023

(65) Prior Publication Data

US 2024/0066903 A1 Feb. 29, 2024

(30) Foreign Application Priority Data

Aug. 31, 2022 (JP) ................................ 2022-137423

(51) Int. Cl.
*B41J 29/377* (2006.01)

(52) U.S. Cl.
CPC .................................. *B41J 29/377* (2013.01)

(58) Field of Classification Search
CPC ................ B41J 29/377; B41J 11/00242; B41J 2025/008; B41J 13/0045; B41J 3/60
See application file for complete search history.

(56) References Cited

U.S. PATENT DOCUMENTS

2009/0284561 A1* 11/2009 Fukui ...................... B41J 29/38 347/104
2013/0044169 A1* 2/2013 Chiwata .............. B41J 11/0085 347/102
2015/0124029 A1* 5/2015 Sugaya .................. B41J 25/001 347/88
2018/0250967 A1* 9/2018 Sato ..................... B41J 2/16517
2020/0247152 A1* 8/2020 Nakazawa ........... B41J 2/16585

FOREIGN PATENT DOCUMENTS

JP 2020029369 A * 2/2020
JP 2021094773 A * 6/2021

OTHER PUBLICATIONS

English Translation JP 2021094773 (Year: 2021).*
English Translation JP 2020029369 (Year: 2020).*

* cited by examiner

*Primary Examiner* — Shelby L Fidler
*Assistant Examiner* — Tracey M McMillion
(74) *Attorney, Agent, or Firm* — CANTOR COLBURN LLP

(57) ABSTRACT

An ink jet recording system including: a conveyance mechanism that includes a temperature controlling conveyance drum that conveys a recording medium to a recording mechanism; a recording mechanism that includes a temperature controlling recording drum that conveys the recording medium, and a process section that applies ink to one surface of the recording medium so as to record an image thereon, a first hardware processor that controls a reversing mechanism to reverse the recording medium to the one surface applied with ink and then delivers the recording medium to the conveyance mechanism, a discharging mechanism provided upstream of the reversing mechanism in a conveyance direction of the recording medium, and a second hardware processor that controls to switch conveyance paths and to determine whether the recording medium to which the ink is applied is conveyed to the discharging mechanism or the reversing mechanism.

12 Claims, 4 Drawing Sheets

INK JET RECORDING SYSTEM AND RECORDING METHOD

REFERENCE TO RELATED APPLICATIONS

The present invention claims priority under 35 U.S.C. § 119 to Japanese Application, 2022-137423, filed on Aug. 31, 2022, the entire contents of which being incorporated herein by reference.

TECHNICAL FIELD

The present invention relates to an ink jet recording system and a recording method. More specifically, the present invention relates to an ink jet recording system and a recording method capable of preventing enlargement of an apparatus thereof, suppressing an increase in the number of components, and suppressing power consumption of a heater.

DESCRIPTION OF THE RELATED ART

In recent years, in order to record high-definition images with a relatively simple configuration for various recording medium such as papers and fabrics, an apparatus (hereinafter, simply referred to as an "ink jet recording apparatus") that ejects ink from a nozzle of an ink jet head (hereinafter, simply referred to as a "head") have been widely used.

In order to guarantee high-definition images, it is required to prevent defects and troubles in advance, and to this end, temperature control is performed on various equipment in an ink jet recording apparatus.

The above-mentioned equipment includes, for example, ink, a tank containing the ink, a head, and a recording medium, and it is especially important to control temperature of the recording medium because it is important to ensure wetting spread and uniformity on the recording medium, of the ink ejected from the nozzle of the head.

For example, if the temperature of the recording medium deviates from an optimum temperature corresponding to intended use of an image (hereinafter, simply referred to as "target temperature") when the ink ejected from the nozzle of the head lands on the recording medium so as to record the image thereon, wetting spread of the ink dots deteriorates and thus quality of the recorded image may deteriorate.

In a conventional ink jet recording apparatus, temperature of a conveying member (a conveying drum called a "drum") that conveys a recording medium is controlled to propagate the temperature (thermal energy) of the conveying member so that the temperature of the recording medium does not deviate from the target temperature.

In particular, when images are recorded on both surfaces (front surface and back surface) of the recording medium, not only temperature control of one surface of the recording medium at the time of ink's landing on the one surface but also temperature control of the other surface of the recording medium must be sufficiently performed, that is, the temperature control of both the front and back surfaces must be sufficiently performed.

In an ink jet recording apparatus according to JPA 2021-94773, a drum having a function of recording an image on a recording medium while conveying the recording medium is provided with a temperature controlling function, and records the image on a front surface of the recording medium with an image recording portion thereof while performing temperature control of a back surface of the recording medium, and then parts with the recording medium to a drum having a function of reversing the recording medium, where the front surface and back surface of the recording medium are reversed. Then, another drum which is installed separately and has a temperature controlling function performs temperature control of the front surface of the recording medium so that temperature of the recording medium does not deviate from target temperature.

However, there remains room for improvement since the temperature control on both sides of the recording medium can be sufficiently performed without increasing the number of components by separately installing the another drum having the temperature control function as described above.

SUMMARY OF THE INVENTION

The present invention has been made in view of the above-mentioned problems and circumstances, and an object of the present invention is to provide an ink jet recording system and a recording method capable of preventing enlargement of an apparatus thereof, suppressing an increase in the number of components, and suppressing power consumption of a heater.

In order to solve the above problems, the present inventors have studied causes and the like of the above problems and have found that the above problems can be solved by providing a temperature control function for a drum for feeding a recording medium that is originally provided in the imaging the recording device, so as to share the temperature control function. This finding leads to the present invention.

To achieve at least one of the abovementioned objects, according to an aspect of the present invention, an ink jet recording system reflecting one aspect of the present invention including a feeding device of a recording medium, a recording device, a discharging device, and first and second hardware processors, wherein the recording device includes a conveyance mechanism, a recording mechanism and a reversing mechanism, the discharging device includes a discharging mechanism, the conveyance mechanism includes a temperature controlling conveyance drum that conveys the recording medium to the recording mechanism while controlling temperature of the recording medium, the recording mechanism includes a temperature controlling recording drum that conveys the recording medium conveyed from the conveyance mechanism, and a process section that applies ink to one surface of the recording medium so as to record an image thereon, the first hardware processor controls the reversing mechanism to reverse the recording medium to the one surface of which the ink is applied and then delivers the recording medium to the conveyance mechanism, and wherein there is provided the discharging mechanism upstream of the reversing mechanism in a conveyance direction of the recording medium, and the second hardware processor controls to switch conveyance paths and to determine whether the recording medium to which the ink is applied is conveyed to the discharging mechanism or the reversing mechanism.

To achieve at least one of the abovementioned objects, according to an aspect of the present invention, a recording method reflecting one aspect of the present invention including a feeding step of a recording medium, a first conveying step, a first recording step, a reversing step, a second conveying step, a second recording step, and a discharging step, wherein in the feeding step, the recording medium is fed from a feeding device to a recording device, in the first conveying step, the recording medium fed by the feeding step is conveyed to a temperature controlling recording drum while being heated by a temperature controlling conveyance drum, in the first recording step, the recording medium conveyed by the first conveying step is conveyed while being heated by the temperature controlling recording drum, and ink is applied to a first surface of the recording medium so as to record an image thereon.

in the reversing step, the recording medium to the first surface of which the ink is applied is reversed, in the second conveying step, the recording medium reversed by the reversing step is conveyed to the temperature controlling recording drum while being heated by the temperature controlling conveyance drum, in the second recording step, the recording medium conveyed by the second conveying step is conveyed while being heated by the temperature controlling recording drum, and ink is applied to a second surface of the recording medium so as to record an image thereon, and in the discharging step, the recording medium to the first surface and the second surface of which the ink is applied is discharged.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Figure 1:
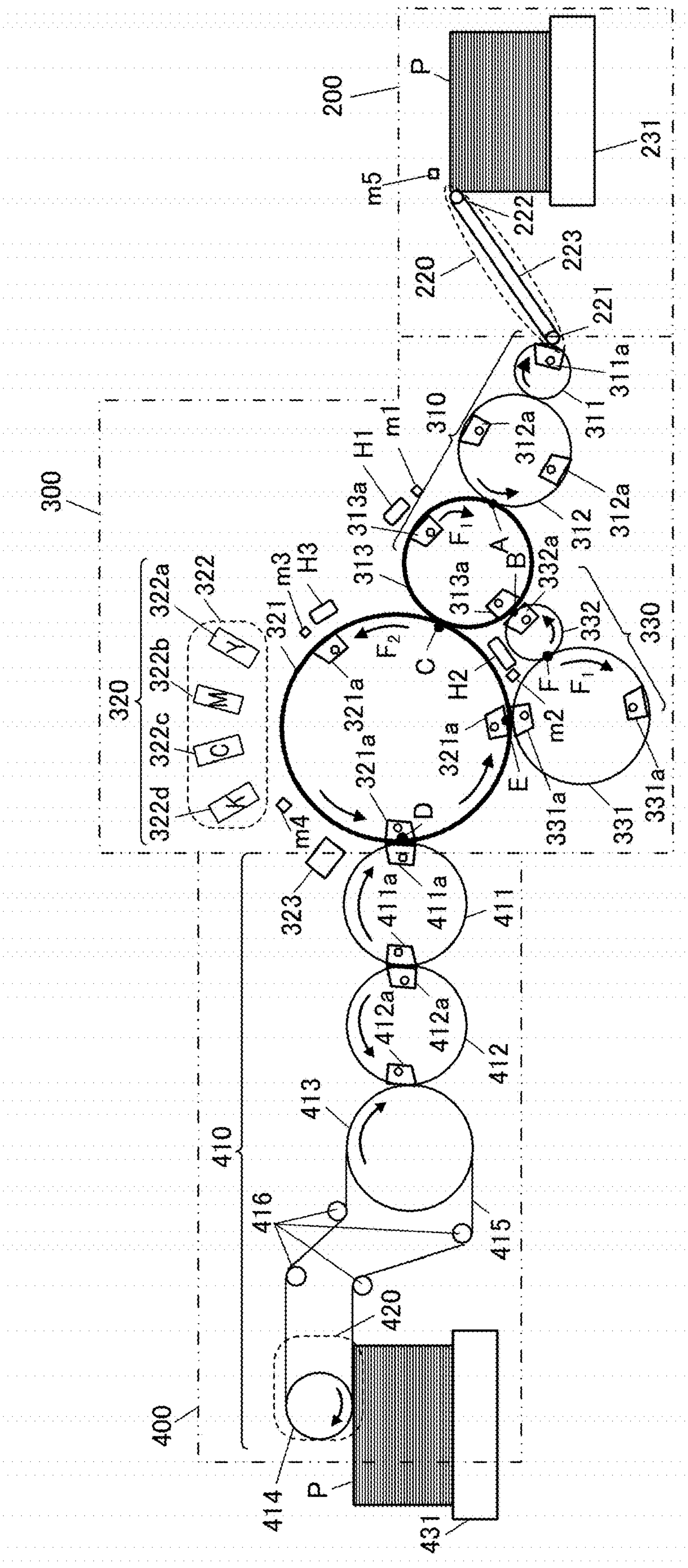
FIG. 1 is a side view illustrating a schematic configuration of an example of the ink jet recording system.

Hereinafter, one or more embodiments of the present invention will be described with reference to the drawings. However, the scope of the invention is not limited to the disclosed embodiments.

An ink jet recording system according to the present invention includes a feeding device of a recording medium, a recording device, a discharging device, and first and second hardware processors, wherein the recording device includes a conveyance mechanism, a recording mechanism and a reversing mechanism, the discharging device includes a discharging mechanism, the conveyance mechanism includes a temperature controlling conveyance drum that conveys the recording medium to the recording mechanism while controlling temperature of the recording medium, the recording mechanism includes a temperature controlling recording drum that conveys the recording medium conveyed from the conveyance mechanism, and a process section that applies ink to one surface of the recording medium so as to record an image thereon, the first hardware processor controls the reversing mechanism to reverse the recording medium to the one surface of which the ink is applied and then delivers the recording medium to the conveyance mechanism, and wherein there is provided the discharging mechanism upstream of the reversing mechanism in a conveyance direction of the recording medium, and the second hardware processor controls to switch conveyance paths and to determine whether the recording medium to which the ink is applied is conveyed to the discharging mechanism or the reversing mechanism.

This feature is a technical feature common to or corresponding to the respective embodiment (aspect) described below.

According to an embodiment of the present invention, it is preferable from the viewpoint of suppressing temperature loss and stably controlling temperature of the recording medium that the conveyance mechanism includes one or more conveyance drums other than the temperature controlling conveyance drum, and the temperature control conveyance drum downstream of the one or more conveyance drums in the conveyance direction.

It is more preferable from the viewpoint of suppressing temperature loss and stably controlling temperature of the recording medium that the recording medium reversed by the reversing mechanism is directly delivered to the temperature controlling conveyance drum.

It is preferable from the viewpoint of shortening the conveyance path and suppressing the enlargement of the apparatus that a location in the conveyance mechanism where the recording medium is directly delivered from the one or more conveyance drums other than the temperature controlling conveyance drum to the temperature controlling conveyance drum or the recording medium is directly delivered from the feeding device to the temperature controlling conveyance drum is defined as a position A, a location in the conveyance mechanism where the recording medium is directly delivered from a drum included in the reversing mechanism to the temperature controlling conveyance drum when the recording medium is delivered from the reversing mechanism to the conveyance mechanism is defined as a position B, a location in the conveyance mechanism where the recording medium is directly delivered from the temperature controlling conveyance drum to the temperature controlling recording drum is defined as a position C, and the position B and the position C are located downstream of the position A in the conveyance direction, and the position B is between the position A and the position C.

In addition, it is preferable from the viewpoint of controlling temperature of the recording medium because the temperature of the recording medium, which is once subject to the temperature control, to one surface of which the ink is applied, and which is fed from the reversing mechanism is normally higher than that of the recording medium fed from the feeding device.

It is preferable from the viewpoint of enhancing heat transfer effect from the conveyance mechanism to the recording medium and suppressing heat dissipation from the recording medium to the reversing mechanism that thermal conductivity of material used for a portion of a drum included in the reversing mechanism with which the recording medium has contact is smaller than thermal conductivity of material used for a portion of the temperature controlling recording drum with which the recording medium has contact.

It is preferable from the viewpoint of improving accuracy of alignment of double-sided image recording that each of the conveyance mechanism, the recording mechanism, and the reversing mechanism includes a plurality of openable and closable claw devices for holding a front end of the recording medium in the conveyance direction in a closed state thereof in a drum included in each of the conveyance mechanism, the recording mechanism, and the reversing mechanism, and at least during a period from application of ink to one surface of the recording medium to application of ink to the other surface of the recording medium by the recording mechanism, the claw device provided in the drum on the upstream side in the conveyance direction is opened and the claw device provided in the drum on the downstream side in the conveyance direction is closed when the recording medium is conveyed in three conveyance paths (1), (2) and (3) described below, whereby the front end of the recording medium in the conveyance direction is sequentially delivered from the drum on the upstream side in the conveyance direction to the drum on the downstream side in the conveyance direction so as to be conveyed.

Conveyance path (1): Path for conveying the recording medium from the recording mechanism to the reversing mechanism Conveyance path (2): Path for conveying the recording medium from the reversing mechanism to the conveyance mechanism Conveyance path (3): Path for conveying the recording medium from the conveyance mechanism to the recording mechanism It is preferable from the viewpoint of being able to reverse recording mediums whose lengths are different that the reversing mechanism includes a drum which rotates at the same speed as a linear speed of a recording medium loading surface of each of a drum included in the conveyance mechanism and the temperature controlling recording drum, and a drum which rotates at a different speed from the linear speed of the recording medium loading surface of each of the drum included in the conveyance mechanism and the temperature controlling recording drum.

It is preferable from the viewpoint of being able to cure ink by actinic radiation that the ink is an actinic radiation curing type of ink, and the recording mechanism includes an ink-curing and drying device.

It is preferable from the viewpoint of realization of the effect according to the present invention that the recording mechanism includes the ink-curing and drying device facing the recording medium conveyed by the temperature controlling recording drum, and curing and drying of the ink by the ink curing and drying device is performed at a position upstream of the position at which the conveyance paths are switched, in the conveyance direction.

It is preferable from the viewpoint of being able to fix the ink on the recording medium that the ink includes a solid component having a colorant and a solvent component, and the recording mechanism includes a drying device for evaporating the solvent component.

It is preferable from the viewpoint of preventing the ink applying surface of the recording medium from contacting a drum (411) included in the discharging mechanism, a drum (331) included in the reversing mechanism and the like to cause the ink to transfer to them that the recording mechanism includes the drying device facing the recording medium conveyed by the temperature controlling recording drum, and evaporation of the solvent component by the drying device is performed at a position upstream of the position at which the conveyance paths are switched, in the conveyance direction.

It is preferable from the viewpoint of performing good and quality-stable image recording that the ink is phase changing ink, and the phase change occurs before and after the ink is recorded on the recording medium.

It is preferable from the viewpoint of securing a temperature control period of the recording medium and stable temperature control that a circumferential length of the temperature controlling conveyance drum is at least twice as long as a maximum length of a sheet of the recording medium in the conveyance direction.

The ink jet recording method according to the present invention includes a feeding step of a recording medium, a first conveying step, a first recording step, a reversing step, a second conveying step, a second recording step, and a discharging step, wherein in the feeding step, the recording medium is fed from a feeding device to a recording device, in the first conveying step, the recording medium fed by the feeding step is conveyed to a temperature controlling recording drum while being heated by a temperature controlling conveyance drum, in the first recording step, the recording medium conveyed by the first conveying step is conveyed while being heated by the temperature controlling recording drum, and ink is applied to a first surface of the recording medium so as to record an image thereon.

in the reversing step, the recording medium to the first surface of which the ink is applied is reversed, in the second conveying step, the recording medium reversed by the reversing step is conveyed to the temperature controlling recording drum while being heated by the temperature controlling conveyance drum, in the second recording step, the recording medium conveyed by the second conveying step is conveyed while being heated by the temperature controlling recording drum, and ink is applied to a second surface of the recording medium so as to record an image thereon, and in the discharging step, the recording medium to the first surface and the second surface of which the ink is applied is discharged.

Thus, the effect of the present invention is realized, and the problem can be solved.

Hereinafter, the present invention, its constituent elements, and embodiments/aspects for carrying out the present invention will be described in detail. Here, in the present application, "to" is used to mean that numerical values described before and after "to" are included as the lower limit value and the upper limit value.

I. Outline of Ink Jet Recording System

An ink jet recording system according to the present invention includes a feeding device of a recording medium, a recording device, a discharging device, and first and second hardware processors, wherein the recording device includes a conveyance mechanism, a recording mechanism and a reversing mechanism, the discharging device includes a discharging mechanism, the conveyance mechanism includes a temperature controlling conveyance drum that conveys the recording medium to the recording mechanism while controlling temperature of the recording medium, the recording mechanism includes a temperature controlling recording drum that conveys the recording medium conveyed from the conveyance mechanism, and a process section that applies ink to one surface of the recording medium so as to record an image thereon, the first hardware processor controls the reversing mechanism to reverse the recording medium to the one surface of which the ink is applied and then delivers the recording medium to the conveyance mechanism, and wherein there is provided the discharging mechanism upstream of the reversing mechanism in a conveyance direction of the recording medium, and the second hardware processor controls to switch conveyance paths and to determine whether the recording medium to which the ink is applied is conveyed to the discharging mechanism or the reversing mechanism.

In the following, a "process section that applies ink to one surface of the recording medium so as to record an image thereon" is also simply referred to as an "the ink jet recording section".

FIG. 1 is a side view illustrating a schematic configuration of an example of the ink jet recording system according to the present embodiment.

Figure 2:
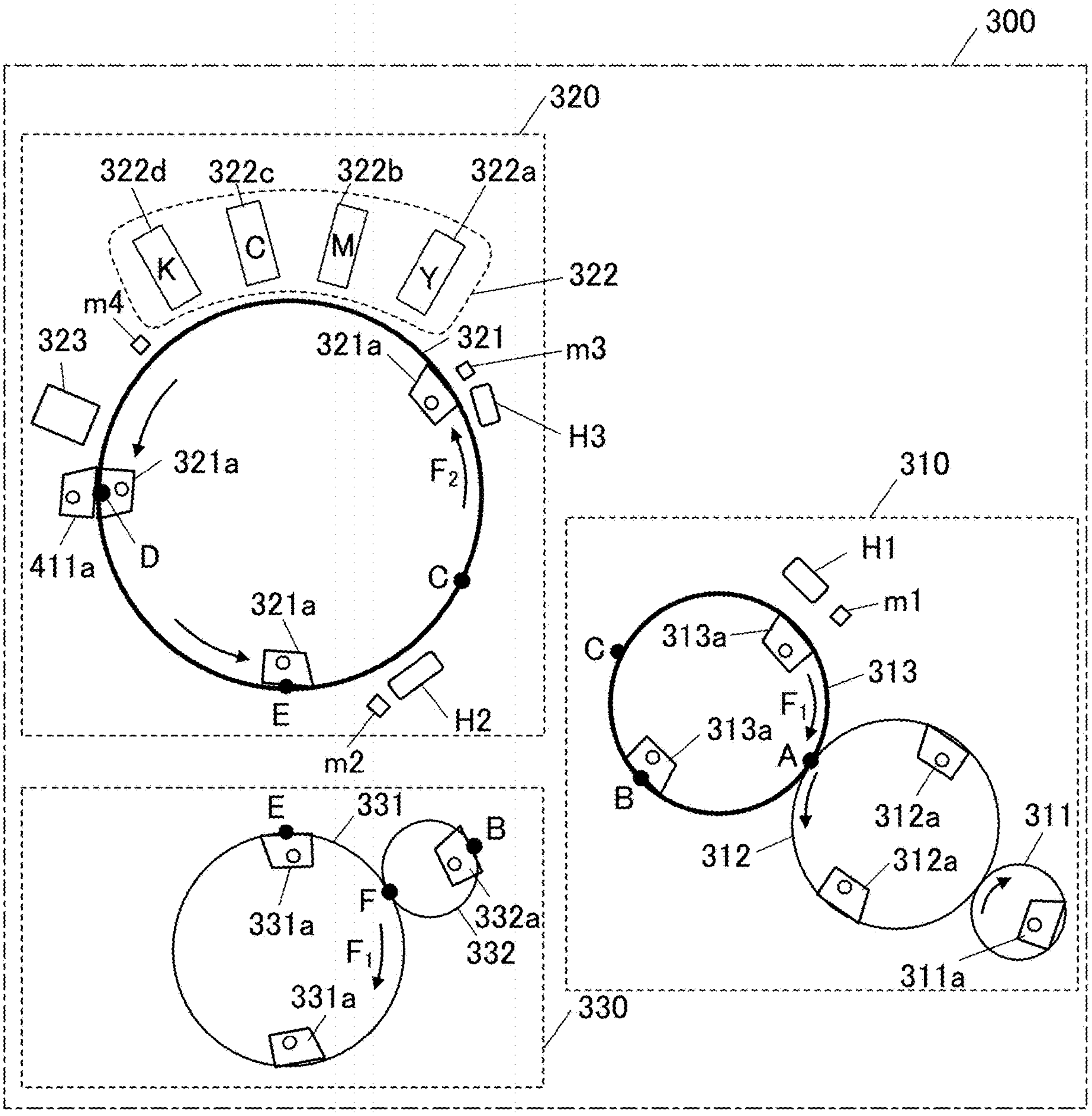
FIG. 2 is a side view illustrating a schematic configuration of each of the mechanisms of the recording device.

In addition, FIG. 2 is a side view illustrating a schematic configuration of each of the mechanisms of the recording device.

Hereinafter, the ink jet recording system according to the present invention will be described referring to FIG. 1 and FIG. 2, and first, a recording device which is a characteristic constituent portion of the present invention will be described, and then the feeding device of the recording medium and the discharging device will be described in this order.

1. The Recording Device

The recording device (300) according to the present invention includes a conveyance mechanism (310), a recording mechanism (320) and a reversing mechanism (330) (see FIGS. 1 and 2).

The conveyance mechanism (310) conveys to the recording mechanism (320) the recording medium (P) fed from a feeding section (220) included in the feeding device (200) shown in FIG. 1 or delivered from the reversing mechanism (330).

The recording mechanism (320) conveys the recording medium (P) delivered from the conveyance mechanism (310) while controlling temperature of the recording medium (P) and records an image on the recording medium (P) conveyed on a temperature controlling recording drum (321), at an ink jet recording section (322) in the recording mechanism (320).

In addition, the recording mechanism (320) is controlled by a "conveyance path switching process section (20)" (a second hardware processor) that determines whether the recording medium (P) on which an image is recorded is conveyed to the discharging mechanism (410) or to the reversing mechanism (330).

The reversing mechanism (330) reverses the front and back surfaces of the recording medium (P) delivered from the recording mechanism (320) and then conveys the recording medium (P) to the conveyance mechanism (310).

In addition, the reversing mechanism (330) is controlled by a controlling section (40) (a first hardware processor) that reverses the recording medium (P) to one surface of which the ink is applied and then delivers the recording medium (P) to the conveyance mechanism (310).

(1.1) Conveyance Mechanism

The conveyance mechanism (310) includes a temperature controlling conveyance drum (313) and conveys the recording medium (P) fed from a feeding section (220) of the feeding device (200) to the recording mechanism (320).

In one embodiment, the conveyance mechanism (310) includes the temperature controlling conveyance drum (313) and conveyance drums (311 and 312) other than the temperature controlling conveyance drum (313), as shown in FIG. 2.

It should be noted that the conveyance mechanism (310) may not include the conveyance drums (311 and 312) other than the temperature controlling conveyance drum (313) but may be configured to include only the temperature controlling conveyance drum (313).

According to an embodiment of the present invention, the conveyance mechanism (310) includes one or more conveyance drums (311 and 312) other than the temperature controlling conveyance drum (313), so that degrees of freedom in designing conveyance paths are increased. Here, it is preferable from the viewpoint of suppressing temperature loss and stably controlling temperature of the recording medium that the temperature control conveyance drum (313) is provided downstream of the conveyance drums (311 and 312) in the conveyance direction.

In addition, it is preferable from the viewpoint of improving accuracy of alignment of double-sided image recording that each of the conveyance mechanism, the recording mechanism, and the reversing mechanism includes a plurality of openable and closable claw devices for holding a front end of the recording medium in the conveyance direction in a closed state thereof in a drum included in each of the conveyance mechanism, the recording mechanism, and the reversing mechanism, and at least during a period from application of ink to one surface of the recording medium to application of ink to the other surface of the recording medium by the recording mechanism, the claw device provided in the drum on the upstream side in the conveyance direction is opened and the claw device provided in the drum on the downstream side in the conveyance direction is closed when the recording medium is conveyed in three conveyance paths (1), (2) and (3) described below, whereby the front end of the recording medium in the conveyance direction is sequentially delivered from the drum on the upstream side in the conveyance direction to the drum on the downstream side in the conveyance direction so as to be conveyed.

Conveyance path (1): Path for conveying the recording medium from the recording mechanism to the reversing mechanism Conveyance path (2): Path for conveying the recording medium from the reversing mechanism to the conveyance mechanism Conveyance path (3): Path for conveying the recording medium from the conveyance mechanism to the recording mechanism (1.1.1) Temperature Controlling Conveyance Drum In the present invention, the "temperature controlling conveyance drum" is a drum (313) that has a function of controlling temperature of the recording medium (P) while supporting the recording medium (P), and conveying the recording medium (P) along a cylindrical outer peripheral curved surface (hereinafter, the "cylindrical outer peripheral curved surface" is simply referred to as an "outer peripheral surface") of the drums (311, 312, and 313) included in the conveyance mechanism.

Note that the drums (311, 312, and 313) included in the conveyance mechanism include both the "temperature controlling conveyance drum (313)" and the "conveyance drums (311 and 312)" described above, but in the present specification it is assumed that just the "conveyance drums" means drums other than the temperature controlling conveyance drum among the drums included in the conveyance mechanism that may or may not have a function of temperature controlling so that the descriptions of the "temperature controlling conveyance drum" and the "conveyance drums" are clearly distinguished from each other.

The temperature controlling conveyance drum (313) has a function of receiving the recording medium (P) from the conveyance drum (312), the conveyance drum (311) or the feeding section (220) included in the feeding device (200), a function of receiving the recording medium (P) from the reversing mechanism (330), and a function of delivering the recording medium (P) to the recording mechanism (320), in addition to the function of controlling temperature of the recording medium as described above.

As an embodiment of the present invention, it is preferable from the viewpoint of being able to secure enough time for temperature control and to stably control temperature that a circumferential length of the temperature controlling conveyance drum (313) is at least twice as long as a maximum length of a sheet of the recording medium (P) in the conveyance direction, so that the length of the recording medium (P) contacting the temperature controlling conveyance drum (313) is increased.

Note that the a "maximum length of a sheet of the recording medium in the conveyance direction" refers to the maximum length in the conveyance direction of a single sheet of the recording medium cut one by one.

(Thermal Conductivity)

It is preferable from the viewpoint of enhancing heat transfer effect from the conveyance mechanism (310) to the recording medium (P) and suppressing heat dissipation from the recording medium (P) to the reversing mechanism (330) that material used for a portion of the temperature controlling conveyance drum (313) with which the recording medium (P) has contact has high thermal conductivity, and it is preferable that thermal conductivity of material used for a portion of each of drums (331 and 332) included in the reversing mechanism (330) with which the recording medium (P) has contact is smaller than thermal conductivity of the material used for the portion of the temperature controlling conveyance drum (313) with which the recording medium (P) has contact.

As an example of the aforementioned, for example, the material used for the portion of the temperature controlling conveyance drum (313) with which the recording medium (P) has contact is aluminum (thermal conductivity of 236 [W/m K]), and the material used for the portion of the drum included in the reversing mechanism (330) with which the recording medium (P) has contact is iron (thermal conductivity of 83.5[W/m K]), and in this case, it is possible to prevent temperature (thermal energy) of the recording medium (P) from being deprived of the reversing mechanism (330).

(Temperature Controlling Member Installed Near Temperature Controlling Conveyance Drum)

A temperature controlling member of the temperature controlling conveyance drum (313) is installed in or in the vicinity of the temperature controlling conveyance drum (313).

In one embodiment, a non-contact heater (e.g., a halogen-lamp, etc.) performing infrared irradiation in the vicinity of the temperature controlling conveyance drum (313) is used to heat the temperature controlling conveyance drum (313).

Further, as the temperature controlling member installed in the vicinity of the temperature controlling conveyance drum (313), a blower fan, and a roller and a belt which incorporate thermoelectric conversion device can be used for heating or cooling, and thermoelectric conversion device can be installed in the temperature controlling conveyance drum (313).

In one embodiment, the temperature controlling conveyance drum (313) is a Peltier roller incorporating a known Peltier device, i.e., a sheet-like device (thermoelectric device) that operates under control of the controlling section (40) (the first hardware processor).

Such thermoelectric conversion device is suitable as a temperature controlling device because switching between a cooling operation and a heating operation can be performed by switching polarity (+ or −) of voltage applied to a sheet-shaped element therein.

As another embodiment, the temperature controlling device incorporated in the temperature controlling conveyance drum (313) may be of a so-called heat pipe type in which a fluid such as cold water or hot water for controlling temperature is circulated and temperature of the fluid is thermally conducted to the passing recording medium (P).

FIG. 1 and FIG. 2 illustrate an example in which a non-contact type of heater is used as the temperature controlling member installed in the vicinity of the temperature controlling conveyance drum (313), but the present invention is not limited thereto (hereinafter, a non-contact type of heater installed in the vicinity of the temperature controlling conveyance drum is simply referred to as a "heater H1").

The heater H1 operates under control of the control section (40) and radiates heat for heating (preheating) the temperature controlling conveyance drum (313) to heat the temperature controlling conveyance drum (313) and thus the recording medium (P) to a predetermined temperature prior to the image recording process (including the image recording process on the front surface of the recording medium as well as the image recording process on the back surface).

Details of the control section (40) will be described later.

Here, the recording medium (P) does not pass a portion along the outer peripheral surface from the position C to the position A (see FIG. 1 and FIG. 2) in the rotational direction ($F_1$ direction, clockwise direction) of the temperature controlling conveyance drum (313), and thus if the heater H1 is installed so as to heat the portion, the heat generated from the heater H1 can be directly radiated to the temperature controlling conveyance drum (313).

(Temperature Sensor for Directly Detecting Temperature of Temperature Controlling Conveyance Drum)

In the vicinity of the heater H1, a temperature sensor (hereinafter, referred to as a "temperature sensor (m1)") is installed at a position facing the portion along the outer peripheral surface from the position C to the position A in the rotational direction ($F_1$ direction, clockwise direction) of the temperature controlling conveyance drum (313), and temperature of the temperature controlling conveyance drum (313) is directly detected by the temperature sensor (m1) to be outputted to the control section (40) (see FIG. 1 and FIG. 2).

The temperature sensor (m1) can directly detect temperature of the temperature controlling conveyance drum (313) because the recording medium (P) does not pass the portion along the outer peripheral surface from the position C to the position A in the rotational direction ($F_1$ direction, clockwise direction) of the temperature controlling conveyance drum (313).

As a temperature detecting element of the temperature sensor (m1), a contact-type of element such as thermocouple or thermistor may be used, but a non-contact-type of element such as thermopile is more preferable.

The control section (40) controls heating operation or cooling operation of the heater H1 or other temperature controlling members based on the temperature detected by the temperature sensor (m1) so that the outer peripheral surface of the temperature controlling conveyance drum (313) has a predetermined temperature.

(1.1.2) Delivering of Recording Medium

In the temperature controlling conveyance drum (313), an openable and closable claw section (313*a*) for holding a front end of the recording medium (P) in the conveyance direction in a closed state thereof is provided, whereby the recording medium (P) is delivered, and a cam-mechanism for causing each of a plurality of claws constituting the claw section (313*a*) to be opened or closed to receive or deliver the recording medium (P) is provided.

Delivering positions of the recording medium (P) related to the temperature controlling conveyance drum (313) are the following three positions (see FIG. 1 and FIG. 2).

(1) Position A

A location where the recording medium is directly delivered from the conveyance drum to the temperature controlling conveyance drum or the recording medium is directly delivered from the feeding device to the temperature controlling conveyance drum.

(2) Position B

A location where the recording medium is directly delivered from a drum included in the reversing mechanism to the temperature controlling conveyance drum (3) Position C A location where the recording medium is directly delivered from the temperature controlling conveyance drum to the temperature controlling recording drum It is preferable from the viewpoint of shortening the conveyance path and suppressing the enlargement of the apparatus that the position B and the position C are located downstream of the position A in the conveyance direction, and the position B is between the position A and the position C.

In addition, it is preferable from the viewpoint of controlling temperature of the recording medium because the temperature of the recording medium, which is once subject to the temperature control, to one surface of which the ink is applied, and which is fed from the reversing mechanism is normally higher than that of the recording medium fed from the feeding device.

Although the recording medium (P) reversed by the reversing mechanism (330) may not be directly delivered to the temperature controlling conveyance drum (313) but may be delivered to the conveyance drum (311, 312), the recording medium (P) reversed by the reversing mechanism (330) may be directly delivered to the temperature controlling conveyance drum (313) to shorten the conveyance path from the reversing mechanism (330) to the conveyance mechanism (310), which is more preferable from the viewpoint of suppressing temperature loss and stably controlling the temperature of the recording medium.

The above-described camming mechanism causes the claw section of the temperature controlling conveyance drum (313) to perform the operation of closing the claws that have been opened, so as to receive the recording medium (P) from the conveyance drum (312) or the drum (332) included in the reversing mechanism when the recording medium (P) is delivered from the conveyance drum (312) to the temperature controlling conveyance drum (313) or from the drum (332) included in the reversing mechanism to the temperature controlling conveyance drum (313).

In addition, the camming mechanism causes the claw section of the temperature controlling conveyance drum (313) to perform the operation of opening the claws that have been closed, so as to deliver the recording medium (P) when the recording medium (P) is delivered from the temperature controlling conveyance drum (313) to the temperature controlling recording drum (321).

At this time, for example, if a diameter of a second reversing drum (332) is set to be 1, a diameter of the temperature control conveyance drum (313) is set to be 2, and a diameter of the temperature control recording drum (321) is set to 3, the second reversing drum (332) is configured to be provided with one claw section (332*a*), the temperature control conveyance drum (313) is configured to be provided with two claw sections (313*a*) every 180°, and the temperature control recording drum (321) is configured to be provided with three claw sections (321*a*) every 120°. When the temperature control recording drum (321) rotates by 120° in the counterclockwise direction ($F_2$ direction) of FIG. 1, the second reversing drum (332) rotates by 360° in the same direction and the temperature control conveyance drum (313) rotates by 180° in the clockwise direction ($F_1$ direction), and the claw section of each drum is opened and closed at its facing position so as to achieve an interconnected operation so that the recording medium (P) is delivered and received (when the reversing mechanism includes two drums, a drum which delivers the recording medium to the conveyance mechanism, but does not receive the recording medium from the temperature control recording drum is referred to as a "second reversing drum").

It is preferable from the viewpoint of shortening the conveyance path and suppressing the enlargement of the apparatus that a location in the conveyance mechanism where the recording medium is directly delivered from the one or more conveyance drums other than the temperature controlling conveyance drum to the temperature controlling conveyance drum or the recording medium is directly delivered from the feeding device to the temperature controlling conveyance drum is defined as a position A, a location in the conveyance mechanism where the recording medium is directly delivered from a drum included in the reversing mechanism to the temperature controlling conveyance drum when the recording medium is delivered from the reversing mechanism to the conveyance mechanism is defined as a position B, a location in the conveyance mechanism where the recording medium is directly delivered from the temperature controlling conveyance drum to the temperature controlling recording drum is defined as a position C, and the position B and the position C are located downstream of the position A in the conveyance direction, and the position B is between the position A and the position C.

In addition, it is preferable from the viewpoint of controlling temperature of the recording medium because the temperature of the recording medium, which is once subject to the temperature control, to one surface of which the ink is applied, and which is fed from the reversing mechanism is normally higher than that of the recording medium fed from the feeding device.

As shown in FIG. 1 and FIG. 2, since the position A is opposite to the position C with the temperature controlling conveyance drum (313) interposed therebetween, an amount of winding of the recording medium (P) fed from the feeding device (200) with respect to the temperature controlling conveyance drum (313) can be obtained, so that the duration of contacting with the recording medium (P) can be sufficiently ensured and the temperature of the recording medium (P) can be stably controlled.

Furthermore, the relationship between the positions A, B, and C with respect to the rotational direction of the temperature controlling conveyance drum (313) (conveyance direction of the recording medium: the counterclockwise direction or $F_1$ direction) is expressed by Equation (1) below, so that it is possible to suppress the shortening of the conveyance path of the recording medium (P) and the enlargement of the device.

(length of the portion along the outer peripheral surface from position $A$ to position $B$ in the rotational direction $F_1$ of the temperature controlling conveyance drum)>(length of the portion along the outer peripheral surface from position $B$ to position $C$ in the rotational direction $F_1$ of the temperature controlling conveyance drum) Equation (1):

The amount of winding of the recording medium (P) conveyed from the reversing mechanism (330) with respect to the temperature controlling conveyance drum (313) is shorter than that of the recording medium (P) fed from the feeding device (200), but temperature of the recording medium (P) fed from the reversing mechanism (330) whose temperature is once controlled and to one surface of which ink is applied is higher than that of the recording medium (P) fed from the feeding device (200), and thus there is no problem.

(1.2) Recording Mechanism

The recording mechanism (320) includes a temperature controlling recording drum (321) that conveys the recording medium (P) conveyed from the conveyance mechanism (310), and there is provided in the recording mechanism a process section (322) (hereinafter, also simply referred to as an "the ink jet recording section") that applies ink to one surface of the recording medium (P) so as to record an image thereon (see FIG. 1 and FIG. 2).

(1.2.1) The Temperature Controlling Recording Drum

A "the temperature controlling recording drum" in the present invention refers to a drum included in the recording mechanism (320) which has a function of controlling temperature of the recording medium (P) while supporting the recording medium (P) on the outer peripheral surface thereof and conveying the recording medium (P), which conveys the recording medium (P) to the discharging mechanism (410) or the reversing mechanism (330) by switching the conveyance path, and which has a function of receiving the recording medium (P) conveyed from the conveyance mechanism (310).

Figure 3:
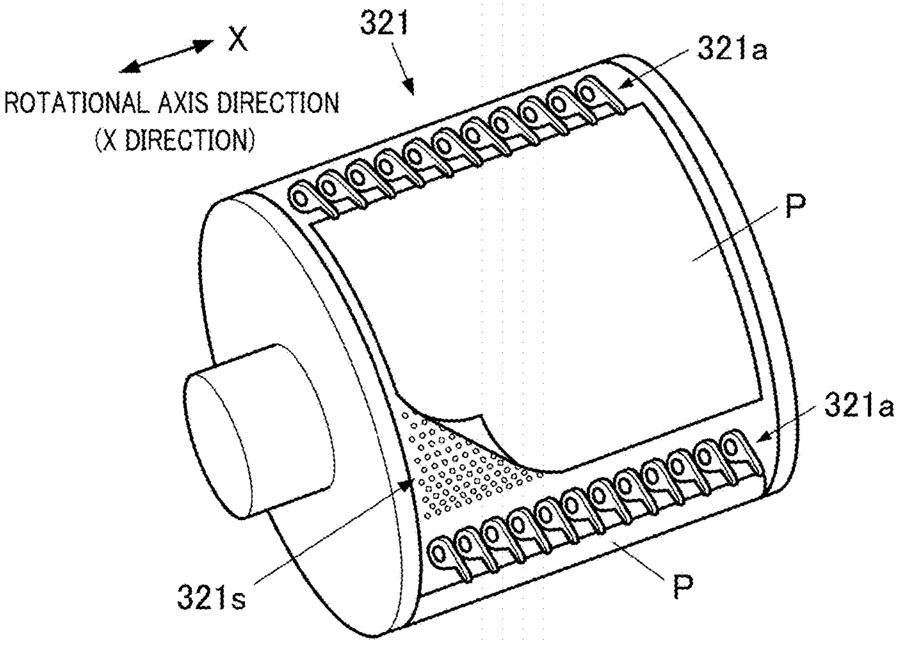
FIG. 3 is an exemplary perspective view of the temperature controlling recording drum.

FIG. 3 is an exemplary perspective view of the temperature controlling recording drum (321).

The temperature controlling recording drum (321) is provided with claw sections 321*a* and an intake section 321*s* for supporting the recording medium (P) on its outer circumferential surface.

In the present Example, the temperature controlling recording drum (321), the temperature controlling conveyance drum (313), a drum (411) included in the discharging mechanism and a first reversing drum (331) have diameters of 3:2:2:2, and in the temperature controlling recording drum (321), claws (321*a*) are arranged at three positions on the outer peripheral surface at equal intervals (when the reversing mechanism is provided with two drums, the drum having a function of receiving the recording medium from the temperature controlling recording drum is referred to as a "first reversing drum").

In addition, the temperature controlling conveyance drum (313), the drum (411) included in the discharging mechanism, and the first reversing drum (331) have claw sections (313*a*, 411*a*, and 331*a*) arranged at two positions on their outer peripheral surfaces at equal intervals.

The claw section (321*a*) of the temperature controlling recording drum is interlocked with the temperature controlling recording drum (321) rotating and is actuated by the camming mechanism (not shown) so that the claw section is opened and closed at positions facing the temperature controlling conveyance drum (313), the drum (411) included in the discharging mechanism, and the first reversing drum (331).

Specifically, for example, the claw section (321*a*) comes in a closed state at a timing when one end of the recording medium (P) is delivered from the temperature controlling conveyance drum (313), thereby holding one end of the recording medium (P).

Further, the claw section (321*a*) comes in an opened state at a timing of delivering one end of the recording medium (P) to the drum (411) included in the discharging mechanism and the first reversing drum (331), thereby delivering one end of the recording medium (P) to the claw section (411*a*) of the drum (411) and the claw section (331*a*) of the first reversing drum (331).

In addition, the temperature controlling recording drum (321) has three the recording medium (P) holding areas, each of which is divided into three equal parts. the temperature controlling recording drum (321) can hold up to three sheets of the recording medium (P).

The temperature controlling recording drum (321) is provided with a drum rotation motor (not shown), and the drum rotation motor is driven under the control of the control section (40) to be rotated in the conveyance direction (counterclockwise direction, $F_2$ direction in FIG. 1 and FIG. 2) by an angle proportional to the rotation amount of the drum rotation motor around a rotation axis extending in a direction perpendicular to the paper surface of FIG. 1 and FIG. 2 to convey the recording medium (P) while holding the recording medium (P) on the outer peripheral surface of the temperature controlling recording drum (321).

The temperature controlling recording drum (321) and the drum rotating motor play a role of conveying the recording medium (P) so as to face nozzle surfaces of the heads (322*a*, 322*b*, 322*c*, and 322*d*).

(Temperature Controlling Member Installed Near Temperature Controlling Recording Drum)

Temperature controlling members other than the temperature controlling recording drum (321) may be provided in the vicinity of the temperature controlling recording drum (321), and the same members as those of the temperature controlling conveyance drum (313) may be used.

In FIG. 1 and FIG. 2, a non-contact type of heater is used as a temperature controlling member installed in the vicinity of the temperature controlling recording drum (321), but the present invention is not limited thereto.

In addition, in FIG. 1 and FIG. 2, among the heaters installed in the vicinity of the temperature controlling recording drum (321), a heater installed upstream of the ink jet recording section and downstream of the position C is simply referred to as a "heater H3", and a heater installed at a position facing a portion along the outer peripheral surface from the position E to the position C in the rotational direction of the temperature controlling recording drum (321) (the conveyance direction of the recording medium and $F_2$ direction) is simply referred to as a "heater H2".

Here, the position E is a position where the recording medium (P) is directly delivered from the temperature controlling recording drum (321) to the first reversing drum (331).

The recording medium (P) does not pass a portion (see FIG. 1) of the temperature controlling recording drum (321) of FIG. 1 and FIG. 2 along the outer circumferential surface from the position E to the position C in the rotational direction (conveyance direction of the recording medium, $F_2$ direction), and thus it is preferable that the heater H2 is installed so as to heat the portion directly since the heat can be efficiently radiated to the temperature controlling recording drum (320) to control temperature thereof without the recording medium (P).

The heater H2 operates under control of the control section (40) and radiates heat for heating (preheating) the temperature controlling recording drum (321) to heat the temperature controlling recording drum (321) and thus the recording medium (P) to a predetermined temperature prior to the recording process on the back surface of the recording medium (P).

Therefore, since the temperature controlling recording drum (321) can be heated more efficiently by the amount not via recording medium (P), it is preferable from the viewpoint of suppressing the power consumed by the heater.

The heater H3 operates under the control of the control section (40) and radiates heat for directly heating the recording medium (P) supported on the temperature controlling recording drum (321) to heat the recording medium (P) from a recording surface thereof.

The above-mentioned "recording surface" refers to a surface of the recording medium (P) to which ink-is applied at the time when the temperature controlling recording drum (320) conveys the recording medium (P).

(Temperature Sensor for Direct Temperature Detection of Temperature Controlling Recording Drum)

In the vicinity of the heater H2, a temperature sensor (hereinafter, referred to as a "temperature sensor (m2)") is installed at a position facing the portion along the outer peripheral surface from the position E to the position C in the rotational direction (conveyance direction of the recording medium, $F_2$ direction, and counterclockwise direction) of the temperature controlling recording drum (321), and temperature of the temperature controlling recording drum (321) is directly detected by the temperature sensor (m2) to be outputted to the control section (40) (see FIG. 1 and FIG. 2).

The temperature sensor (m2) can directly detect temperature of the temperature controlling recording drum (321) because the recording medium (P) does not pass the portion along the outer peripheral surface from the position E to the position C in the rotational direction ($F_2$ direction, counterclockwise direction) of the temperature controlling recording drum (321).

As a temperature detecting element of the temperature sensor (m2), the same element as that of the temperature sensor (m1) as described above can be used.

The control section (40) controls heating operation or cooling operation of the temperature controlling members so that the outer peripheral surface of the temperature controlling recording drum (321) has a predetermined temperature based on the temperature detected by the temperature sensor (m2).

(Temperature Sensor that Detects Temperature of Recording Medium that is Supported on Temperature Controlling Recording Drum)

A temperature sensor (hereinafter, such a temperature sensor is referred to as a "temperature sensor (m3)") is installed downstream of the heater H3, in the upstream vicinity of the ink jet recording section and downstream of the position C, and the temperature of the recording medium (P) is detected and outputted to the control section (40).

As a temperature detecting element of the temperature sensor (m3), the same element as that of the temperature sensor (m1) as described above can be used.

The temperature sensor (m3) can also detect temperature of the temperature controlling recording drum (321) when the recording medium (P) is not passing the temperature controlling recording drum (321).

(Intake Section)

As shown in FIG. 3, the intake section (321*s*) includes a plurality of intake holes provided on the outer peripheral surface of the temperature controlling recording drum (321) along which the recording medium (P) whose one end is held by the claw section (321*a*), and a suction force generating section (not shown) that generates a suction force so as to suck a gas into the temperature controlling recording drum (321) through the intake holes.

Examples of a member used in the suction force generating section include a blower and a fan.

That is, the intake section (321*s*) sucks the recording medium (P) along the outer peripheral surface of the temperature controlling recording drum (321) by the suction force generated by the intake air from the intake hole.

As a specific example, the temperature controlling recording drum (321) has a hollow interior of its drum which is divided into three portions corresponding to three holding regions of the recording medium (P), and the temperature controlling recording drum (321) is provided with an intake circuit (not shown) which makes it possible to select the respective intake section (321*s*) of each holding region and apply suction force individually.

As a result, it is possible to operate so as not to apply a suction force to the holding region that does not hold the recording medium (P), and it is possible to prevent a decrease in suction force caused by the intake section (321*s*) in the holding region that does not hold the recording medium (P), as in the case where the interior is not divided.

In addition, in FIG. 3, a part of the recording medium (P) is turned up from the outer peripheral surface of the temperature controlling recording drum (321), and this is intended to illustrate the intake hole, and the entire the recording medium (P) is supported along the outer peripheral surface of the temperature controlling recording drum (321) at the time of recording an image by the ink jet recording section (322).

(1.2.2) Delivering of Recording Medium

In the temperature controlling recording drum (321), an openable and closable claw section (321*a*) for holding a front end of the recording medium (P) in the conveyance direction in a closed state thereof is provided (see FIG. 3), and the claw section (321*a*) is disposed at each boundary position of the three holding regions of the recording medium (P), that is, at a 120° interval around the rotational axis of the temperature controlling recording drum (321), and each of these three claw sections (321*a*) is constituted of a plurality of claws arranged in a row along a rotational axis direction (X direction in FIG. 3) of the temperature control recording drum on the outer peripheral surface of the temperature controlling recording drum (321).

The recording medium (P) is delivered by these, and a cam-mechanism for causing each of the plurality of claws constituting the claw section (321*a*) to be opened or closed to receive or deliver the recording medium (P) is provided.

Note that the delivering positions of the recording medium (P) related to the temperature controlling recording drum (321) are the following three positions (see FIG. 1 and FIG. 2).

(1) Position C

A location where the temperature controlling recording drum receives the recording medium directly from the temperature controlling conveyance drum.

(2) Position D

A location where the recording medium is directly delivered from the temperature controlling recording drum to the drum included in the discharging mechanism.

(3) Position E

A location where the recording medium (P) is directly delivered from the temperature controlling recording drum to the drum included in the reversing mechanism.

It is preferable from the viewpoint of improving accuracy of alignment of double-sided image recording that at least during a period from application of ink to one surface of the recording medium (P) to application of ink to the other surface of the recording medium (P) by the recording mechanism (320), the claw device provided in the drum on the upstream side in the conveyance direction is opened and the claw device provided in the drum on the downstream side in the conveyance direction is closed when the recording medium (P) is conveyed from the recording mechanism (320) to the recording mechanism (320) again via reversing mechanism (330) and the conveyance mechanism (310), whereby the front end of the recording medium (P) in the conveyance direction is sequentially delivered from the drum on the upstream side in the conveyance direction to the drum on the downstream side in the conveyance direction so as to be conveyed.

The above-described camming mechanism causes the claw section (321*a*) of the temperature controlling recording drum (321) to perform the operation of opening the claws that have been closed, so as to deliver the recording medium (P) to the drum (411) included in the discharging mechanism or to the drum (331) included in the reversing mechanism when the recording medium (P) is delivered from the temperature controlling recording drum (321) to the drum (411) included in the discharging mechanism or from the temperature controlling recording drum (321) to the drum (331) included in the reversing mechanism.

In addition, the camming mechanism causes the claw section of the temperature controlling recording drum (321) to perform the operation of closing the claws that have been opened, so as to receive the recording medium (P) when the recording medium (P) is delivered from the temperature controlling conveyance drum (313) to the temperature controlling recording drum (321).

At this time, for example, if a diameter of each of the drum (411) and the temperature controlling conveyance drum (313) is set to be 2, and a diameter of the temperature controlling recording drum (321) is set to be 3, the drum (411) and the temperature controlling conveyance drum (313) rotate by 180° in the clockwise direction ($F_1$ direction) so as to achieve an inter-connected operation when the temperature control recording drum (321) rotates by 120° in the counterclockwise direction ($F_2$ direction).

(1.2.3) Ink Jet Recording Section

In the present invention, "the ink jet recording section" is a process section included in the recording mechanism (320) that applies ink to one surface of the recording medium (P) so as to record an image thereon and includes a plurality of heads each ejecting ink of different color, and a head driving section (30) that drives these heads.

In FIG. 1 and FIG. 2, each of the heads (322*a*, 322*b*, 322*c*, and 322*d*) ejects ink from a nozzle opening provided on an ink ejection surface facing a conveyance surface of the temperature controlling recording drum (321) to the recording medium (P) at an appropriate timing in accordance with the rotation of the ink ejection surface in which recording medium (P) is held, to apply ink to the recording medium (P) and record an image thereon.

(Ink Jet Heads)

The heads (322*a*, 322*b*, 322*c*, and 322*d*) are arranged such that a distance between each ink ejection surface and the conveyance surface of the temperature controlling recording drum (321) is separated by a predetermined distance, and a plurality of nozzles for individually ejecting ink to the recording medium (P) conveyed on the temperature controlling recording drum (321) are provided so as to be perpendicular to the conveyance direction of the recording medium (P).

Each of the heads may be provided with an ink tank (not shown) for storing ink and supplying ink to each head, and may be provided with an ink heater and the like (not shown) as a means for heating the ink before ejection, whereby temperature of the ink before ejection can be optimized, ink can be ejected with an appropriate viscosity, and image recording with stable quality can be performed.

The ink path from each ink tank to each head (322*a*, 322*b*, 322*c*, and 322*d*) is provided with a supply pressure control mechanism, and the supply pressure is controlled to a pressure slightly lower than the atmospheric pressure so that the ink does not spill out from the nozzle of each head (322*a*, 322*b*, 322*c*, and 322*d*).

Figure 4:
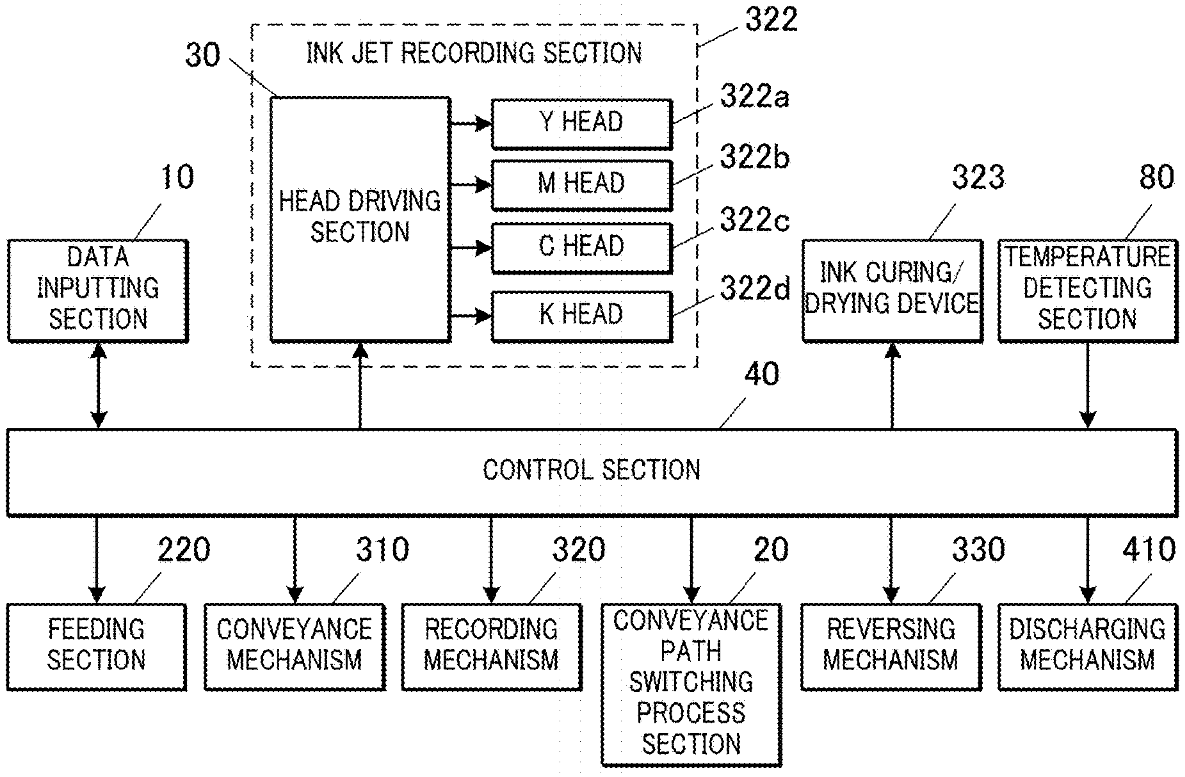
FIG. 4 is a block diagram illustrating main functional configuration of the ink jet recording system.

Further, a head driving section (30) that drives each head (322*a*, 322*b*, 322*c*, and 322*d*) is provided, and the head driving section (30) causes each nozzle corresponding each head (322*a*, 322*b*, 322*c*, and 322*d*) to eject ink in an amount in accordance with a pixel value of image data by supplying each head with a driving signal for deforming piezoelectric elements in accordance with the image data at an appropriate timing based on the control of the control section (40) (see FIG. 4).

In the example shown in FIG. 1 and FIG. 2, four heads (322*a*, 322*b*, 322*c*, and 322*d*) corresponding to respective inks of yellow (Y), magenta (M), cyan (C), and black (K) are arranged from the upstream side in the conveyance direction so as to be arranged at predetermined intervals in the order of the colors of yellow (Y), magenta (M), cyan (C), and black (K) from the upstream side in the conveyance direction of the recording medium (P).

Although not shown, in one embodiment, each head (322*a*, 322*b*, 322*c*, and 322*d*) is provided with a plurality of recording elements each having a pressure chamber for storing ink, a piezoelectric element provided on a wall surface of the pressure chamber, and a nozzle.

When a driving signal for deforming the piezoelectric element is inputted to the recording element, the pressure chamber is deformed by the deformation of the piezoelectric element to change the pressure in the pressure chamber, so that ink is ejected from the nozzle communicating with the pressure chamber.

(Temperature Controlling Member in Upstream Vicinity of Ink Jet Recording Section)

A temperature sensor (m3) which detects temperature of the recording medium (P) is installed downstream of the aforementioned position C on the outer peripheral surface of the temperature controlling recording drum (321) in the conveyance direction and in the upstream vicinity of the ink jet recording section (322) in the conveyance direction, and a heater H3 such as a non-contact halogen lamp for emitting infrared radiation is installed on the upstream side of the temperature sensor (m3) in order to heat the recording medium (P) on the outer peripheral surface of the temperature controlling recording drum (321) before image recording (before image recording on a front surface or before image recording on a back surface) (see FIG. 1 and FIG. 2).

In addition, a temperature controlling member other than the above-described heater H3 may be provided.

As the temperature control member, a temperature control member which is the same as the temperature control member installed in the vicinity of the temperature controlling conveyance drum (313) or the temperature controlling recording drum can be used.

(Temperature Sensor in Upstream Vicinity of Ink Jet Recording Section)

As the temperature sensor (m3), a contact-type of temperature detecting element such as thermocouple or thermistor may be used, but a non-contact-type of temperature detecting element such as thermopile is more preferable.

The control section (40) controls heating operation of the heater H3 or other temperature controlling members based on the temperature detected by the temperature sensor (m3) so that temperature of the recording medium (P) passing the vicinity of the heater H3 while being supported by the temperature controlling recording drum (321) has a predetermined temperature.

The temperature sensor (m3) can also detect temperature of the temperature controlling recording drum (321) when the recording medium (P) is not passing the temperature controlling recording drum (321).

(Ink)

Although there is no particular limitation on the ink, it is preferable from the viewpoint of being able to cure ink in a short time by actinic radiation that the ink is an actinic radiation curing type of ink, and the recording mechanism (320) includes an ink-curing and drying device (ink curing/drying device) (323).

Curing properties of actinic radiation curing type of ink are often susceptible to temperature, but the temperature of the temperature controlling recording drum (321) is controlled appropriately when the ink is used, and thus better and quality-stable image recording can be performed.

The actinic radiation curing type of ink may have a property of being cured by, for example, ultraviolet radiation.

In addition, the actinic radiation only needs to be energy radiation having a property of curing ink in accordance with the property of the ink, such as infrared radiation, electron radiation, and other energy radiation, in addition to the ultraviolet radiation described above, and the light source may be replaced in accordance with the energy radiation.

The actinic radiation curing type of ink may optionally contain a gelling agent, a polymerization initiator, a polymerization inhibitor, a colorant such as a dye and a pigment, a dispersant for dispersing the pigment, a fixing resin for fixing the pigment to a base material, a surfactant, a pH controlling agent, a humectant, a UV absorber, and the like.

The other components may contain only one kind or two or more kinds of components in the composition.

In addition, it is preferable from the viewpoint of performing good and quality-stable image recording that the ink is phase changing ink, and the phase change occurs before and after the ink is recorded on the recording medium (P).

When the ink has a property of changing phase with temperature, the temperature of the temperature controlling recording drum (321) is controlled appropriately, whereby the viscosity of the ink can be controlled to prevent the ink droplets ejected from the nozzle of ink jet head (322*a*, 322*b*, 322*c*, and 322*d*) from being mixed with each other, so that better and quality-stable image recording can be performed.

Even when ink other than the above-described ink, for example, ink that does not have a phase-change property depending on the temperature of the ink, ink that does not have a curing property by energy radiation, or ink that does not have both of these properties, is used for image recording, temperature control by the temperature controlling conveyance drum, the temperature controlling recording drum, and other temperature controlling members (hereinafter, the "the temperature controlling conveyance drum, the temperature controlling recording drum, heaters, and other temperature controlling members" are collectively referred to simply as "temperature controlling members and the like") is meaningful as long as ink that requires image recording at appropriate temperature is used, When the ink includes a solid component having a colorant and a solvent component, the ink curing/drying device (323) may be a drying device that evaporates the solvent component.

Examples of the drying device include a non-contact type of drying device such as an infra-red heater or a hot air blower.

As the colorant of the ink, either a pigment or a dye may be used, but the colorant is preferably a pigment from the viewpoint of forming an image having high weather resistance, and a conventionally known colorant can be used without any particular limitation. For example, an organic pigment such as an insoluble pigment or a lake pigment and an inorganic pigment such as titanium oxide can be preferably used.

In image recording using ink in an ink jet recording method and the like that eject liquid, appropriate temperature control for the ink is often required in order to achieve proper viscosity of the ink and dry fixing after image recording.

In order to optimize temperature of the ink prior to ejection, it is sufficient to heat the ink at the head to maintain the appropriate temperature, but in order to optimize temperature of the ink after ejection, that is, temperature of the ink droplets ejected onto the recording medium (P), it is essential to control temperature of the recording medium (P) on which the ink lands, and it is required to heat the recording medium (P) or the temperature controlling recording drum (321) in contact therewith to maintain the appropriate temperature.

When the recording medium (P) which is particularly thin, and thus has a small heat capacity (P) is conveyed on the temperature controlling recording drum (321), heating the surface of the temperature controlling recording drum (321) and propagating thermal energy to the recording medium (P) is easier to maintain the appropriate temperature of the recording medium (P) than heating the recording medium (P) itself, and thus it is more effective to heat the surface of the temperature control recording drum (321) when the recording medium (P) does not cover the surface of the temperature control recording drum (321) in order to maintain the appropriate temperature.

To this end, as mentioned above, it is effective to install the heater H2 so as to be able to heat the portion along the outer circumferential surface from the position E to the position C in the rotational direction ($F_2$ direction, counterclockwise direction) of the temperature controlling recording drum (321) in which the recording medium (P) does not pass.

(1.2.4) Ink Curing and Drying Device

It is preferable from the viewpoint of preventing the ink applying surface of the recording medium (P) from contacting a drum (411) included in the discharging mechanism, a drum (331) included in the reversing mechanism and the like to cause the ink to transfer to them that the recording mechanism (320) includes the drying device (323) facing the recording medium (P) conveyed by the temperature controlling recording drum, and evaporation of the solvent component by the drying device is performed at a position upstream of the position at which the conveyance paths are switched, in the conveyance direction.

When an ultraviolet curing type of ink is used, for example, a LED, a high-pressure mercury lamp, and the like is used for the ink curing/drying device (323). A light emitting section disposed in a direction perpendicular to the paper surface of FIG. 1 and FIG. 2 emits, via emission of the LED, the lamp, and the like to the recording medium (P) supported on the temperature controlling recording drum (321), actinic radiation such as ultraviolet radiation having a wavelength corresponding to the characteristics of the polymerization initiator and the like in the ink, to the ink ejected on the recording medium (P), thereby causing the ink to polymerize to be cured and fixed on the recording medium (P).

The ink-curing/drying device (323) is provided in the vicinity of the outer peripheral surface of the temperature controlling recording drum (321) and is located downstream of the ink jet recording section (322) and upstream of the discharging mechanism (410) with respect to the conveyance direction of the recording medium (P) due to rotation of the temperature controlling recording drum (321).

When an actinic radiation curing type of ink is used, the ink curing/drying device (323) emits the recording medium (P) supported on the temperature controlling recording drum (321) and ejected with the actinic radiation to cure the ink on the recording medium (P).

The actinic radiation includes, for example, ultraviolet radiation, but may be energy radiation having a property of curing the ink in accordance with the properties of the ink, such as infrared radiation, electron radiation, and other energy radiation.

The light source is not limited to a LED or a high-pressure mercury lamp but may be a mercury lamp having an operating pressure of several hundred [Pa] to 1 mega [Pa], a light source that can be used as a sterilizing lamp, a cold-cathode tube, an ultraviolet laser light source, a metal halide lamp, and the like. Here, a light source which can emit ultraviolet radiation with high illuminance and is power-saving is desirable.

When an ink containing a solid-forming component including a colorant and a solvent component is used, the ink curing/drying device (323) may be a drying device that evaporates the solvent component.

Examples of the drying device include a non-contact type of drying device such as an infra-red heater or a hot air blower.

(Temperature Sensor in Downstream Vicinity of Inkjet Recording Section)

A temperature sensor for detecting the temperature of the recording medium (P) may be installed in the downstream vicinity of the ink jet recording section (322) and upstream of the ink-curing/drying device (323) (hereinafter, a temperature sensor installed at this position is referred to as a "temperature sensor (m4)"), and temperature of the recording medium (P) is detected and outputted to the control section (40) (see FIG. 1 and FIG. 2).

The temperature sensor (m4) can also detect temperature of the temperature controlling recording drum (321) when the recording medium (P) is not passing through.

(1.3) Reversing Mechanism

The reversing mechanism (330) includes a mechanism section (hereinafter referred to as "reverse delivering mechanism section") that reverses the recording medium to the one surface of which the ink is applied and then delivers the recording medium to the conveyance mechanism, and the reversing mechanism (330) is provided downstream of the discharging mechanism in the conveyance direction of the recording medium. Here, the "upstream of the reversing mechanism in a conveyance direction of the recording medium" means the direction as viewed from the position D.

(1.3.1) Reverse Delivering Mechanism Section

When image recording is performed on both the front and back surfaces (hereinafter, "both surfaces") of the recording medium (P), the recording medium (P) is separated from the temperature controlling recording drum (321) by being received from the temperature controlling recording drum (321), for example, at the position E in FIG. 1, due to the function of reversing the front and back surfaces of the recording medium (P), and then is reversed by the reversing mechanism (330).

Then, the recording medium (P) is delivered to the conveyance mechanism (310) at position B in FIG. 1.

When the reversing mechanism (330) is constituted by the first reversing drum (331) and the second reversing drum (332), the position where the recording medium is delivered from the first reversing drum (331) to the second reversing drum (332) is the position F (see FIG. 1 and FIG. 2).

For example, in FIG. 1, the reversing mechanism (330) includes two drums (331 and 332), and among the two drums (331 and 332) included in the reversing mechanism (330), a drum (331) (referred to as "first reversing drum (331)" as described above) having a function of receiving the recording medium (P) from the temperature controlling recording drum (321) has a diameter which is approximately twice as long as that of the drum (332) (referred to as the "second reversing drum" as described above) that delivers the recording medium (P) to the temperature controlling conveyance drum (313) included in the conveyance mechanism (310), and the first reversing drum (331) is rotated by a motor (hereinafter referred to as an "independent drive motor") (not shown).

Note that the reversing mechanism (330) and the conveyance mechanism (310) are not limited to the configurations of FIG. 1 and FIG. 2, and for example, the reversing mechanism (330) may be formed of only the first reversing drum (331), and in such a case, the drum in the conveyance mechanism (310) to which the recording medium (P) is delivered from the first reversing drum (331) may be the conveyance drum (312).

The recording medium (P) reversed by the reversing mechanism (330) is directly delivered to the temperature controlling conveyance drum (313) included in the conveyance mechanism (310) or is delivered to the conveyance drums (311, 312) included in the conveyance mechanism (310), but it is more preferable from the viewpoint of suppressing temperature loss and stably controlling temperature of the recording medium that the recording medium (P) is directly delivered to the temperature controlling conveyance drum (313) because the conveyance path is shortened.

It is preferable from the viewpoint of being able to reverse recording mediums whose lengths are different that the reversing mechanism (330) includes a drum which rotates at the same speed as a linear speed of a recording medium loading surface of each of drums (311, 312, or 313) included in the conveyance mechanism and the temperature controlling recording drum (321) and a drum which rotates at a different speed from the linear speed of the recording medium loading surface of each of the drums (311, 312, or 313) included in the conveyance mechanism and the temperature controlling recording drum (321).

(1.3.1.1) First Reversing Drum

The first reversing drum (331) has a claw section (331*a*) that having the same construction for pinching one end of the recording medium (P) as that of the claw section (321*a*) of the temperature controlling recording drum (321), has a diameter which is approximately twice as long as that of the second reversing drum (332), and is rotated by an independent drive motor that is a drive source independent of the aforementioned the temperature controlling recording drum (321), the drum (332) described below and the like.

(1.3.1.2) Second Reversing Drum

When the reversing mechanism (330) includes the second reversing drum (332) as shown in FIG. 1 and FIG. 2, the second reversing drum (332) includes an openable and closable claw section (332*a*) for holding a front end of the recording medium (P) in the conveyance direction in a closed state thereof, and a cam-mechanism for causing each of a plurality of claws constituting the claw section (332*a*) to be opened or closed to receive or deliver the recording medium (P) is provided in the second reversing drum (332).

(1.3.1.3) Delivering the Recording Medium

In FIG. 1 and FIG. 2, the first reversing drum (331) is provided with an openable/closable claw (331*a*) for holding the front end of the recording medium (P) in a closed state, and the position at which the recording medium (P) is delivered from the temperature controlling recording drum (321) to the first reversing drum (331) is the position E described above.

It is preferable from the viewpoint of improving accuracy of alignment of double-sided image recording that at least during a period from application of ink to one surface of the recording medium (P) to application of ink to the other surface of the recording medium (P) by the recording mechanism (320), the claw device provided in the drum on the upstream side in the conveyance direction is opened and the claw device provided in the drum on the downstream side in the conveyance direction is closed when the recording medium (P) is conveyed from the recording mechanism (320) to the reversing mechanism (330) and when the recording medium (P) is conveyed from the reversing mechanism (330) to the conveyance mechanism (310), whereby the front end of the recording medium (P) in the conveyance direction is sequentially delivered from the drum on the upstream side in the conveyance direction to the drum on the downstream side in the conveyance direction so as to be conveyed.

In order to deliver the recording medium (P) from the first reversing drum (331) to the second reversing drum (332), the control section (40) controls the independent drive motor at a predetermined rate corresponding to the length of the recording medium (P) in the conveyance direction such that, after the claw section (331*a*) of the first reversing drum that conveys the recording medium (P) passes the proximate facing position F to the second reversing drum (332), the rear end of the recording medium (P) (the end not sandwiched by the claw section (331*a*) of the first reversing drum (331)) reaches the position F at a timing when the claw section (332*a*) of the second reversing drum reaches the position $F_1$.

The claw section (332*a*) of the second reversing drum receives the end of the recording medium (P) by closing the claws that have been opened at the timing of passing the position F owing to the camming device.

Thereafter, the claw section (331*a*) of the first reversing drum (331) opens the claws at a predetermined position owing to a camming mechanism (not shown) to release the recording medium (P), whereby the recording medium (P) is delivered from the first reversing drum (331) to the second reversing drum (332) while the conveyance direction is reversed.

Further, the claw section (332*a*) of the second reversing drum is, while holding the end of the recording medium (P), rotated to a position B which is the proximate facing position F to the temperature controlling conveyance drum (313), and then the claw section (332*a*) of the second reversing drum opens the claws owing to a cam mechanism (not shown) to release the end of the recording medium (P), and at the same time, the claw section (313*a*) of the temperature controlling conveyance drum (313) that has reached the position B closes the clows owing to a cam mechanism (not shown). whereby delivering the recording medium (P) from the second reversing drum (332) to the temperature controlling conveyance drum (313) is performed.

As described above, the first reversing drum (331) and the second reversing drum (332) constitute the reversing mechanism (330) that reverses the conveyance direction of the recording medium, but the reversing mechanism (330) in the present invention is not limited thereto, and the reversing mechanism (330) may be constituted only by the first reversing drum (331).

In this case, the recording medium (P) is delivered from the first reversing drum (331) to a drum among drums in the conveyance mechanism (310), for example, a drum (312), which has the same movement direction of a drum surface thereof at the delivering position of the recording medium (P) as that of the drum surface of the first reversing drum.

2. Feeding Device and Discharging Device of the Recording Medium (2.1) Feeding Device The feeding device (200) includes a feed tray (231) for storing the recording medium (P), a feeding section (220) for feeding the recording medium (P) from the feed tray (231) to the recording device (300), and a temperature sensor (hereinafter referred to as "temperature sensor (m5)") for measuring the temperature of the recording medium (P) (see FIG. 1).

(Feed Tray)

The feed tray is a plate-shaped member that is configured to be able of mounting a plurality of the recording mediums (P) in a stacked state which are cut into predetermined sizes.

Further, the feed tray is configured to move up and down in accordance with the amount of the mounted recording mediums (P), and the uppermost recording medium (P) is held at a position from which the uppermost recording medium (P) is fed to the conveyance mechanism (310) included in the recording device (300) by the feeding section (220).

The uppermost sheet of the recording mediums (P) is suctioned by a suction section (not shown) included in a movable arm and the like and is conveyed to the feeding section (220).

(Feeding Section)

The feeding section drives a feed belt (223) which has an inner side thereof supported by a plurality of (for example, two) rollers (221 and 222) to rotate the rollers (221 and 222) while mounting the recording medium (P) thereon and feeds the recording medium (P) to the recording device (300) along the feed belt (223).

(Temperature Sensor Installed in Vicinity of Feeding Device)

A temperature sensor (m5) for measuring the temperature of the recording medium (P) during the above-mentioned feeding operation is installed, and such a temperature sensor is preferably, for example, a non-contact infrared detection type of sensor and the like, and the temperature sensor is installed so as to face the uppermost recording medium (P).

In one embodiment, the temperature sensor (m5) includes a first thermistor for sensing the infrared radiation emitted from the uppermost recording medium (P) supported on the feed tray (231) and a second thermistor for measuring the ambient temperature for temperature compensation, wherein the temperature of the recording medium (P) is measured by computing the outputs of the two thermistors.

The temperature sensor (m5) outputs the measured temperature of the uppermost recording medium (P) to the control section (40) as a detection signal.

(Recording Medium)

The recording medium (P) placed on the above-described feed tray (231) used in the image recording system of the present invention is not particularly limited, and examples thereof include various kinds of coated printing paper such as plain paper from thin paper to cardboard, high-quality paper, art paper or coated paper, water-soluble paper, commercially available Japanese paper or postcard paper, plastic film, cloth, leather, and the like, but are not limited thereto, and the color of the recording medium (P) is not particularly limited.

(2.2) Discharging Device

The discharging device (400) according to the present invention includes a discharging mechanism (410), and the recording medium (P) to which the ink is applied is conveyed to discharging device (400) after the conveyance path switching process section (20) (the second hardware processor) for switching conveyance paths determines that the recording medium (P) is conveyed to the discharging mechanism (410) (see FIG. 1).

(2.2.1) Discharging Mechanism

In the discharging mechanism (410) according to the present invention, as shown, for example in FIG. 1, A drum (411) for receiving the recording medium (P) from the temperature controlling recording drum (321), a drum (412) for receiving the recording medium (P) from a drum (411), a plurality of discharging chains (415) for receiving the recording medium (P) from a drum (412) and delivering them to a discharging section (420), a plurality of gears (413) on the drum (412) side for driving a discharging chain (415), and a plurality of tension gears (416) for applying tension to a plurality of gears (414) and a discharging chain (415) mounted in the discharging section (420) are provided. The recording medium (P) delivered from the temperature controlling recording drum (321) is conveyed by the discharging mechanism (410) and discharged by the discharging section (420) via the discharging chain (415).

The drum (411) of the discharging mechanism is provided with two sets of claw sections (411*a*) that sandwich one end of the recording medium (P) with the same configuration as the claw sections (321*a*) of the temperature controlling recording drum (321).

Provided is a cam mechanism which causes a plurality of claws constituting the claw section (321*a*) of the temperature controlling recording drum (321) and the claw section (411*a*) of the drum (411) to open and close to receive or deliver the recording medium (P) when the claw section (321*a*) of the temperature controlling recording drum and the claw section (411*a*) of the drum (411) are in the delivering position D from the temperature controlling recording drum (321) to the discharging mechanism (410).

The cam mechanism can switch whether the recording medium (P) is delivered to the discharging mechanism (410) or to the reversing mechanism (330) owing to the control section (40).

(Discharge Section)

Similar to the drum (411), the drum (412) is also provided with two sets of claw sections (412*a*), and the discharging chain (415) is also provided with a plurality of claw sections (415*a*) at a distance of ½ of the circumferential length of the drum (411) and the drum (412). Further, provided are cam mechanisms which cause a plurality of claws constituting the respective claw sections to open and close at positions where the drum (411) and the drum (412) face each other and where the drum (412) and the discharging chain (415) face each other, and the recording medium (P) is delivered from the drum (411) to the discharging chain (415) via drum (412), and at the position of the discharge portion (420), the claws of the claw section (not shown) of the discharging chain (415) are opened by a cam mechanism for opening and closing the claws, and the recording medium (P) is placed on the discharge tray (431) that is plate-shaped.

The discharging section (420) stores the recording medium (P) on the discharge tray (431) until the recording medium (P) after recording of an image is taken out by a user.

3. Conveyance Path Switching Process Section

The recording device (300) according to the present invention includes the discharging mechanism (410) upstream of the reversing mechanism (330) with respect to a conveyance direction of the recording medium, and the conveyance path switching process section (20) (the second hardware processor) determines whether the recording medium (P) to which the ink is applied to is conveyed to the discharging mechanism (410) or to the reversing mechanism (330).

In addition, the recording device (300) can selectively perform image recording on only the front surface of the recording medium (P) and image recording on both the front and back surfaces, and when the image recording on only the front surface is performed continuously, the recording medium (P) is delivered from the temperature controlling recording drum (321) to the discharging mechanism (410) each time to be discharged.

Therefore, when image recording is performed only on the front surface, the control section (40) controls an actuator for switching operations of the cam mechanism to switch to a state in which the claw section (321*a*) of the temperature controlling recording drum and the claw section (411*a*) of the drum (411) become active.

4. Interlocking Operation of Each Drum

For example, as shown in FIG. 1, the drums (311, 312, 313) included in the conveyance mechanism, and the drums (411, 412) and the plurality of gears (413, 414) included in the discharging mechanism are connected by gear trains (not shown), respectively, and perform a rotation operation in conjunction with the temperature controlling recording drum (321) by one drive motor, and the second reversing drum (332) included in the reversing mechanism performs a rotation operation in conjunction with the temperature controlling recording drum (321) by a gear train (not shown).

However, only the first reversing drum (331) of the drums (331 and 332) included in the reversing mechanism performs a rotation operation by an independent drive motor independent of the rotation operation described above.

That is, the rotation speed control of the reversing motor is performed independently of the rotation of the temperature controlling recording drum (321) by the driving source of the first reversing drum (331) because the rotation speed control according to the size of the recording medium (P) is required so that the end of the recording medium (P) not held by the claw section reaches the position close to and facing the drum (332) when the claw section (332*a*) of the second reversing drum (332) rotating at a timing interlocked with the rotation of the temperature controlling recording drum (321) reaches the position F which receives the recording medium (P) from the first reversing drum (331).

5. Control Section

The control section (40) performs various controls such as adjustment of set temperatures of the temperature control member and the like, and controls of the conveyance mechanism (310), the recording mechanism (320), the discharging mechanism (410), and the reversing mechanism (330), according to desired image recording conditions based on the detection signals outputted from the respective temperature sensors (see FIG. 4).

Note that, as described above, the temperature controlling conveyance drum and the temperature controlling recording drum, the heaters, and the other temperature controlling members are collectively referred to as "temperature controlling members and the like" in this specification.

The above-described "image recording conditions" may include various conditions such as an amount of ink (referred to as the same "surface ink amount") of an image (ink image) formed on a surface of the recording medium (P) (referred to as a "paper"), and a size of a paper (referred to as "paper size" in the same way), a size of an image formed on a surface of a paper (referred to as a "surface image size" in the same way), a type of ink to be used, a type of paper (such as a material and a basis weight), and a temperature and humidity around the apparatus.

(5.1) Surface Ink Amount, Etc.

In one specific example, the control section (40) determines, as an image recording condition, a set temperature of the temperature control member and the like according to the values (in other words, the mode of the image recorded on the surface of the paper) including the surface ink amount, the paper size, and the surface image size.

These values, particularly the amount of surface ink, are important factors in estimating energy of heat of cure generated when the actinic radiation ink cures.

(5.2) Basis Weight, Etc.

In another embodiment, the control section (40) determines a set temperature in the temperature controlling conveyance drum (313) according to the basis weight of the paper and a temperature change amount [° C.] of the temperature controlling recording drum or the paper.

(5.2.1) Low Basis Weight: Thin Paper

Considering heat capacity or heat insulating property based on the paper conveyance mode and the basis weight of the paper, it is considered better to determine the set temperature in the temperature controlling conveyance drum (313) according to the temperature change amount of the temperature controlling recording drum (321) instead of the temperature change amount of the paper because the effect of the heat propagated from the temperature controlling recording drum (321) to the entire paper is large in the thin paper having low heat insulating property (heat capacity).

More specifically, in the case where the basis weight of the paper is small, in other words, in the case of the thin paper with low heat insulating property, the control section (40) determines the set temperature in the temperature controlling conveyance drum (313) in accordance with the temperature variation [° C.] of the temperature controlling recording drum (321).

In addition, if the paper is thin paper, it is desirable to set the temperature setpoint in the temperature controlling conveyance drum (313) to the temperature for temperature control (e.g., refrigeration) of the temperature controlling recording drum (321).

In this example, the temperature variation of the temperature controlling recording drum (321) is the difference [° C.] between the surface temperature of the temperature controlling recording drum (321) immediately before the most upstream portion of the ink jet recording section (in this example, the head (322*a*)) (the surface temperature of the temperature controlling recording drum sensed by the temperature sensor (m3)) and the surface temperature (the surface temperature of the temperature controlling recording drum sensed by the temperature sensor (m4)) in the vicinity upstream of the position of the ink-curing and drying device (323).

(Creation of Correspondence Table Between Image Recording Conditions of Thin Paper and Set Temperature of Controlling Conveyance Drum)

In the present embodiment, the temperature of the difference is determined experimentally under various image recording conditions (the amount of surface ink or the amount of energy of actinic radiation outputted from the ink curing/drying device (323), the size of various thin papers, and the like), and it is preferable to prepare a correspondence table between the image recording conditions (including the temperature of the difference and the set temperature in the temperature controlling conveyance drum (313)) and the set temperature of the temperature controlling recording drum (321).

(5.2.2) Large Basis Weight: Cardboard

In the case of cardboard having a higher heat insulation property (heat capacity), since the effect of heat propagated from the temperature controlling recording drum (321) to the entire paper is reduced, it is desirable to measure the temperature change of the actual paper (cardboard) and set the set temperature in the temperature controlling conveyance drum (313) to a temperature for temperature control (e.g., refrigeration) of back surface of the paper (cardboard).

More specifically, in a case where the basis weight of the paper is large, in other words, in a case where heat capacity is large and the heat insulating property is high, the control section (40) determines the set temperature in the temperature controlling conveyance drum (313) in accordance with the temperature change amount[° C.] of the paper (cardboard).

Here, the temperature change amount of the paper is a difference[° C.] between the temperature of the paper measured by the temperature sensor (m3) prior to image recording and the temperature of the paper measured by the temperature sensor (m4) after image recording (after actinic radiation).

It is preferable to create a correspondence table between the image recording conditions (including the temperature of the difference and the set temperature in the temperature controlling conveyance drum (313)) and the set temperature in the temperature controlling recording drum (321).

(5.3) Temperature Control Member

Although not shown in FIG. 1 and FIG. 2, the temperature control member other than the temperature controlling recording drum (321) and the temperature controlling conveyance drum (313) may be, for example, a non-contact type of heater (for example, a halogen lamp and the like) which emits infrared radiation, a blower fan for heating or cooling, a roller and a belt incorporating thermoelectric converter, and the like.

In addition, thermoelectric converter can be incorporated in the temperature controlling recording drum (321) and the temperature controlling conveyance drum (313) themselves, and the temperature controlling recording drum (321) and the temperature controlling conveyance drum (313) themselves or the paper can be heated or cooled by installing the above-described temperature controlling member in the vicinity.

When a fan is used as the temperature control member, for example, a known Peltier fan may be used, and the control section (40) can adjust the temperature of the paper by changing the wind speed of the fan or the temperature (air temperature) of the air to be blown.

However, if the wind speed of the fan is excessively increased, there is a possibility that problems such as misalignment of the paper may occur, and therefore, it is desirable that the control section (40) mainly performs control for changing the air temperature (that is, the set temperature of the temperature control device).

(5.4) Functions of the Various Elements that Make Up System

As described above, the ink jet recording system of the present invention includes, as shown in FIG. 1, a feeding device (200) including a feeding section (220), a recording device (300) including a conveyance mechanism (310), a recording mechanism (320), and a reversing mechanism (330), and a discharging device (400) including a discharging mechanism (410), and includes a conveyance path switching process section (20) and an reverse delivering mechanism section (not shown), and the ink jet recording system will be described in the following from the viewpoint of functional configuration.

Referring to FIG. 4, the ink jet recording system includes a control section (40) for controlling the entire system, a data inputting section (10) for inputting and storing various data related to an image recording job, an ink jet recording section (322) including a head driving section (30), an ink curing/drying device (323), a temperature detecting section (80), and the like.

(5.4.1) Data Inputting Section

The data inputting section (10) includes an inputting interface, a memory, and the like connected to an external device such as a PC (personal computer (not shown).

As the memory, for example, HDD (Hard Disk Drive) may be used, and DRAM (Dynamic Random Access Memory) and the like may be used in combination.

Under the control of the control section (40), data inputting section (10) acquires (inputs and stores) data (such as a job command, image data of an image to be printed, and various setting data) related to the image recording job from an external device, and outputs the image data to the head driving section (30) when the image recording job is executed.

(5.4.2) Ink Jet Recording Section

The "the ink jet recording section" is a process section included in the recording mechanism (320) that applies ink to one surface of a paper and records images, and includes a plurality of heads (322*a*, 322*b*, 322*c*, and 322*d*) that eject ink of different colors, and a head driving section (30) that drives the heads.

In FIGS. 1 and 2, a head (322*a*, 322*b*, 322*c*, and 322*d*) ejects ink onto a paper from a nozzle opening provided on an ink ejection surface facing a conveyance surface of a temperature controlling recording drum (321) at an appropriate timing in accordance with rotation of the temperature controlling recording drum (321) holding the paper and applies ink to the paper to record an image.

(Heads Driving Section)

Heads driving section (30) supplies a driving signal for deforming the piezoelectric elements in accordance with the image data to the respective heads (322*a*, 322*b*, 322*c*, and 322*d*) at appropriate timings under the control of the control section (40), thereby causing the nozzle of the corresponding head (322*a*, 322*b*, 322*c*, and 322*d*) to eject ink in amounts corresponding to pixel values of the image data.

(5.4.3) Ink Curing and Drying Device

The ink-curing and drying device (323) includes a light-emitting section arranged in a plane perpendicular to the plane of FIG. 1 and FIG. 2 of the temperature controlling recording drum (321).

The ink curing/drying device (323) emits the paper supported on the temperature controlling recording drum (321) with energy radiation corresponding to the characteristic of the ink from the light-emitting portion, thereby curing or drying and fixing the ink on the ink paper ejected onto the paper.

In the exemplary embodiments shown in FIG. 1 and FIG. 2, it is assumed that an ultraviolet (UV) curing type of ink is ejected from a head (322*a*, 322*b*, 322*c*, and 322*d*).

The ink used in the ink jet recording section (322) is not limited thereto and may have a property of being cured or dried by, for example, emitting other energy radiation such as infrared radiation or electron radiation.

A drum (411) facing the temperature controlling recording drum (321) is provided downstream of the ink-curing and drying device (323) in the conveyance direction.

Further, a first reversing drum (331) and a temperature controlling conveyance drum (313) are provided downstream of the drum (411).

Among the above, the drum (411) is responsible for delivering the paper to the discharging mechanism when the image recording job ends, the first reversing drum (331) plays a role of delivering the paper to the reversing mechanism (330) and reversing the paper during back surface image recording, and the temperature controlling conveyance drum (313) plays a role of delivering the paper delivered from the reversing mechanism (330) to the temperature controlling recording drum (321) while controlling the temperature.

Further, the drum (411) and the first reversing drum (331) are provided with a claw section (411*a*) and a claw section (331*a*) respectively which are opened and closed under the control of the control portion (40).

The claw sections described above of the drum (411), the first reversing drum (331) and the like, form a part of a conveyance path switching process section (20) (see FIG. 4) for switching the paper conveyance direction.

(5.4.4) Temperature Detected Portion

The temperature sensors (m1)-(m5) detect each temperature the paper, the temperature controlling recording drum (321) and the temperature controlling conveyance drum (313) (hereinafter, each portion detected by the temperature sensor (m1)-(m5) is simply referred to as a "temperature detected portion"), and outputs the detection result (detection signal) to the control section (40).

A temperature sensor (m1) is located in the vicinity of the heater H1 and opposite a portion along the outer peripheral surface from the position C to the position A in the rotational direction ($F_1$ direction, clockwise direction) of the temperature controlling conveyance drum (313) and detects the temperature of the temperature controlling recording drum (321).

The temperature sensor (m2) is installed in the vicinity of the heater H2 and at a position facing a portion along the outer peripheral surface from the position E to the position C in the rotational direction of the temperature controlling recording drum (321) (the conveyance direction of the paper, $F_2$ direction, and the counterclockwise direction) to detect temperature of the temperature controlling recording drum (321).

A temperature sensor (m3) is installed in the vicinity of the upstream side of the ink jet recording section and downstream side of the heater (H3), detects the temperature of the paper or the temperature controlling recording drum (321), and outputs the temperature to the control section (40).

A temperature sensor (m4) is located in the vicinity of the downstream side of the ink jet recording section and upstream of the ink-curing and drying device to sense the temperature of the paper or the temperature controlling recording drum (321).

A temperature sensor (m5) senses the temperature of the paper prior to being fed to the conveyance mechanism (321).

As the temperature detecting device of the temperature sensor (m1)-(m5), a contact-type of device such as thermocouple or thermistor may be used, but a non-contact-type of device such as thermopile is more preferable.

Then, the control section (40) performs various processes related to the temperature control based on the detection signals output from the respective temperature sensors arranged as described above.

(5.4.5) Others

The control section (40) includes a CPU (Central Processing Unit), a RAM (Random Access Memory), and a ROM (Read Only Memory).

(CPU)

The CPU reads out various control programs and setting data stored in ROM and stores the programs in RAM and executes the programs to perform various arithmetic processes.

In addition, CPU performs overall control of the entire operation of the ink jet recording system.

(RAM)

The RAM provides job memory space for the CPU and stores temporary data.

The RAM may include a nonvolatile memory.

(ROM)

The ROM stores various control programs executed by the CPU, setting data, and the like.

Instead of ROM, a rewritable nonvolatile memory such as an EEPROM (Electrically Erasable Programmable Read Only Memory or a flash memory may be used.

(5.5) Procedure for Controlling an Image Recording Job

In the image recording system of the present invention, the following control of the image recording job is performed under the functional configuration of the control section (40).

Figure 5:
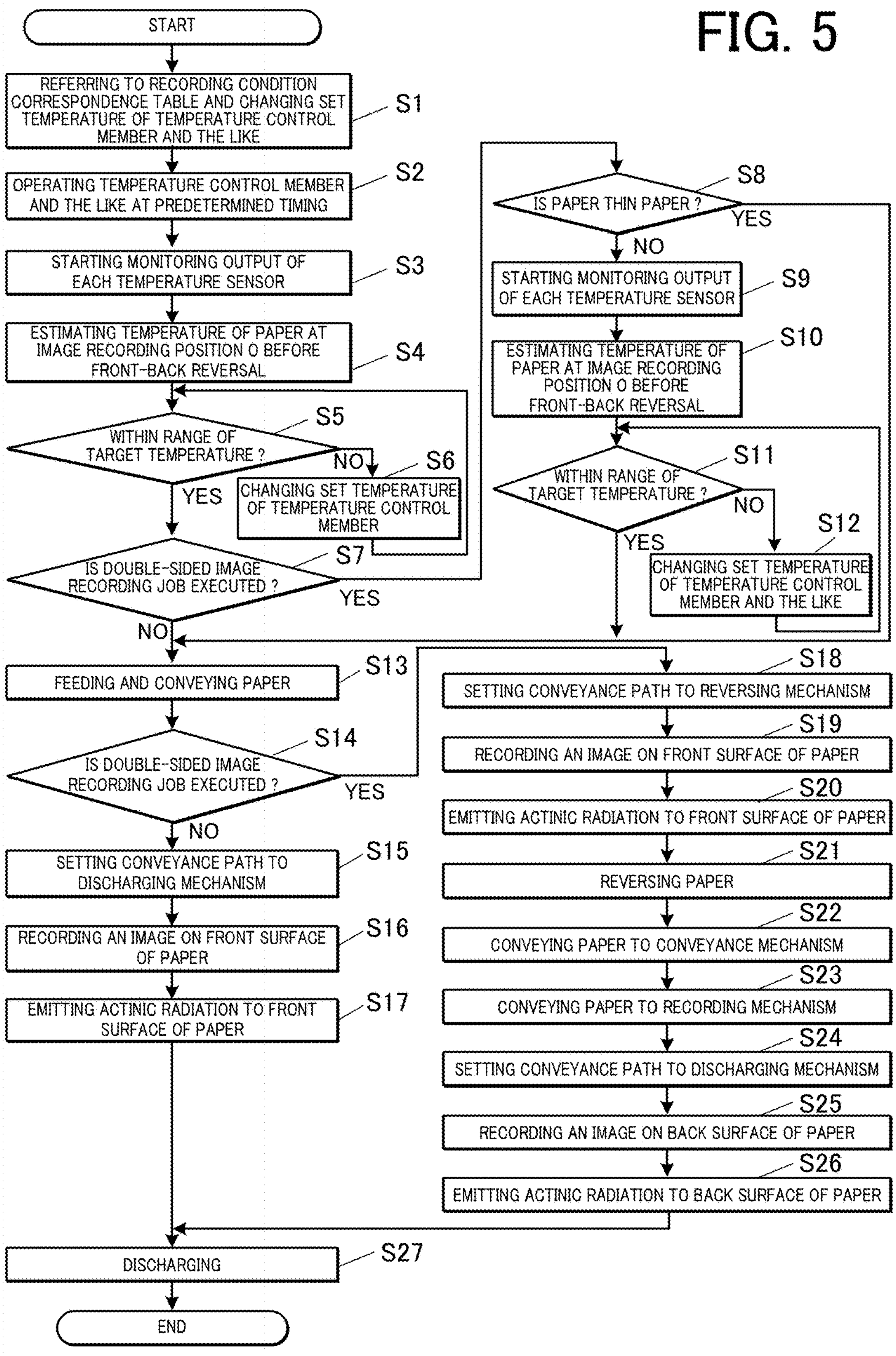
FIG. 5 is a flowchart of the outline of the processing at the time of execution of the image recording job.

Hereinafter, an outline of processing when an image recording job (a single-sided image recording job or a double-sided image recording job) is executed will be described with reference to a flowchart of FIG. 5.

<Start>

When the image recording job is executed, the control section (40) drives and controls the drum rotation motor so as to start the rotation operation of the temperature controlling recording drum (321).

<Step S1>

The control section (40) refers to the correspondence table between the image recording condition of the thin paper or the thick paper and the set temperature of the temperature controlling conveyance drum (313), which has been prepared in advance as described above, determines the target temperature of the temperature controlling conveyance drum (313) and the temperature controlling recording drum (321) corresponding to the present image recording condition, and changes the set temperature of the temperature control member and the like.

<Step S2>

Subsequently, the control section (40) operates the temperature control member and the like at a predetermined timing to performs a process of controlling the surface temperature of the predetermined regions of the temperature controlling conveyance drum (313) and the temperature controlling recording drum (321) and proceeds to <Step S3>.

Here, the "predetermined area" is an area from the time when the paper (thin paper or cardboard) before and after the front-back reversing operation is conveyed to the temperature controlling conveyance drum (313) to the time when the paper is conveyed to the temperature controlling recording drum (321).

<Step S3>

The control section (40) starts monitoring the output (detection signal) of the temperature sensors used for temperature detection of the temperature controlling recording drum (321) and the temperature controlling conveyance drum (313) and stores the detected temperature.

<Step S4>

Subsequently, the control section (40) estimates the temperature of the paper at the image recording position before the front-back reversal on the basis of the values stored in <step S3> and the various image recording conditions (such as the surface-ink amount) described above.

In one embodiment, in step S4, the control section (40) estimates the image recording position of the paper, i.e., the paper temperature on the temperature controlling conveyance drum (313) at a position facing the ink jet recording section (322), based on the temperature of the temperature controlling conveyance drum (313) sensed by the temperature sensor (m1), the temperature of the temperature controlling recording drum (321) sensed by the temperature sensor (m2), the thickness of the paper, the specific heat, etc.

<Step S5>

Next, the control section (40) determines whether or not the estimated paper temperature before the front-back reversal falls within the range of the target temperature (for example, 40 to 50[° C.]).

Here, when the control section (40) determines that the estimated temperature of the paper is within the target temperature, the process proceeds to <step S7>.

On the other hand, when it is determined that the estimated paper temperature before the front-back reversal does not fall within the target temperature range, it is determined that the temperature of the paper needs to be controlled, and the process proceeds to <step S6>.

<Step S6>

The control section (40) changes the set temperature of the temperature control member such as the heater H1, H2, and H3 based on the difference between the estimated paper temperature and the target temperature so that the estimated paper temperature before the front-back reversal falls within the range of the target temperature.

Then, the process returns to step S5 and repeats steps S5 and S6 until the estimated paper temperature falls within the target temperature range.

Specifically, when the estimated paper temperature before the front-back reversal exceeds the upper limit of the range of the target temperature, the set temperature of the temperature control member such as the heater H1, H2, and H3 is lowered in accordance with the excess width.

Conversely, when the estimated paper temperature before the front-back reversal exceeds the lower limit of the range of the target temperature, the set temperature of the temperature control member such as the heater H1, H2, and H3 is increased in accordance with the excess width.

Note that, when the paper before the front-back reversal is conveyed by the temperature controlling recording drum (321), the control section (40) can estimate whether the paper temperature at the image recording position actually falls within the target temperature based on the detection results of the temperature sensor (m3) and the temperature sensor (m4).

For this reason, the control section (40) may feed back the detection results of the temperature sensor (m3) and the temperature sensor (m4) to the temperature control of the paper to be image-recorded next.

<Step S7>

Subsequently, the control section (40) determines whether or not to execute the double-sided image recording job based on the input information from the user.

Here, the control section (40) executes only single-sided image recording when executing not the double-sided image recording job but single-sided image recording is input by the user.

That is, the process proceeds to <step S27> after the processes of <step S13> to <step S17> described later.

On the other hand, when the double-sided image recording job is executed, the control section (40) proceeds to <Step S13> through the following steps of <Step S8> to <Step S12>.

<Step S8>

When the double-sided image recording job is executed, the control section (40) determines whether or not the paper is a thin paper from the basis weight of the paper to be used.

Here, when the control section (40) determines that the paper is thin paper, the process proceeds to <step S13> without performing the processes of <step S9> to <step S12>.

When determining that the paper is not thin paper, the control section (40) determines that the paper is thick paper or plain paper and proceeds to <Step S13> through the processes of <Step S9> to <Step S12> described below.

<Step S9>

The control section (40) starts monitoring the output (detection signal) of the temperature sensors used for temperature detection of the temperature controlling recording drum (321) and the temperature controlling conveyance drum (313) and stores the detected temperature.

<Step S10>

Subsequently, the control section (40) estimates the paper temperature at the image recording position after the front-back reversal, that is, at a position facing the ink jet recording section (322) on the temperature controlling conveyance drum (313), based on the values stored in <Step S9> and the various image recording conditions (surface ink amount, etc.) described above.

In one embodiment, in <Step S10>, the control section (40) obtains the amount of energy of the hardening heat generated and the amount of increase in the surface temperature of the paper [° C.] based on the amount of surface ink to be ejected (landed) onto the paper and the aspect of the image (position to be recorded, etc.).

Then, the control section (40) adds the temperature increase to the paper temperature at the image recording position before the front-back reversal estimated in <step S4>, thereby estimating the paper temperature immediately after being emitted with the actinic radiation by the ink-curing/drying device (323).

Subsequently, the control section (40) estimates the paper temperature at the image recording position after the front-back reversal from the estimated paper temperature before the front-back reversal immediately after the irradiation with the actinic radiation, the temperature of the temperature controlling conveyance drum (313) and the temperature controlling recording drum (321) detected by the respective temperature sensors, the basis weight of the paper as an index of the heat insulating property, the temperature detected by a temperature sensor (not shown) in the machine, and the like.

<Step S11>

Next, the control section (40) determines whether or not the paper temperature at the estimated image recording position after the front-back reversal falls within the range of the target temperature (for example, 40 to 50[° C.]).

Here, when the control section (40) determines that the paper temperature at the estimated image recording position after the front-back reversal falls within the target temperature range, the control section skips the <step S12> and proceeds to the <step S13>.

On the other hand, when it is determined that the paper temperature at the estimated image recording position after the front-back reversal does not fall within the target temperature range, it is determined that the temperature of the paper needs to be controlled, and the process proceeds to <step S12>.

<Step S12>

The control section (40) changes the set temperature of the heater H1, the other temperature control member, and the like so that the estimated paper temperature after the front-back reversal falls within the target temperature.

Thereafter, the process returns to step S11, and the steps S11 and S12 are repeated until the estimated paper temperature falls within the target temperature range.

More specifically, when the paper temperature at the estimated image recording position after the front-back reversal exceeds the upper limit of the target temperature, the control section (40) lowers the set temperature of the heater H1 or the control section (40) increases the air volume of the blower fan to blow a cool wind or changes the set temperature of the thermoelectric converting device to be lower so as to increase the cooling capacity of the blower fan, the roller incorporating the temperature controlling device, and the like.

On the other hand, when the paper temperature at the estimated image recording position after the front-back reversal exceeds the lower limit of the target temperature, the control section (40) raises the set temperature of the heater H1 or the control section (40) decreases the air volume of the blower fan to blow a hot wind or changes the set temperature of the thermoelectric converting device to be higher so as to decrease (lower) the cooling capacity of the blower fan, the roller incorporating the temperature controlling device, and the like.

Note that, when the paper after the front-back reversal is conveyed by the temperature controlling recording drum (321), the control section (40) can estimate whether the paper temperature at the image recording position actually falls within the target temperature based on the detection results of the temperature sensor (m3) and the temperature sensor (m4).

For this reason, the control section (40) may feed back the detection results of the temperature sensor (m3) and the temperature sensor (m4) to the temperature control of the paper to be double-sided image-recorded.

<Step S13>

Subsequently, the control section (40) controls the feeding section (220) and the like included in the feeding device (200) so as to start the operation of feeding the paper to the conveyance mechanism (310).

According to the above-described respective controls, the paper fed from the feeding device (200) is conveyed through the feeding section (220) and the conveyance mechanism (310) while the leading edge in the conveyance direction is supported by any of the claws (321*a*) of the temperature controlling recording drum (321) rotating in the counter-clockwise direction ($F_2$ direction) in FIG. 1.

<Step S14>

Subsequently, the control section (40) executes the double-sided image recording job or the single-sided image recording job by referring to the input of the user as to whether or not to execute the double-sided image recording job according to the above-described <step S7>.

When the single-sided image recording job is executed, the process proceeds to <Step S27> after the following steps of <Step S15> to <Step S17>.

On the other hand, when the double-sided image recording job is executed, the control section (40) proceeds to <Step S27> after the following steps of <Step S18> to <Step S26>.

<Step S15>

When the single-sided image recording job is executed without executing the double-sided image recording job, the control section (40) performs a process of setting the conveyance path to the discharging mechanism (410).

<Step S16>

The heads (322*a*, 322*b*, 322*c*, and 322*d*) of Y, M, C, and K are sequentially driven to eject ink from the corresponding heads, and a process of recording an image on the paper is performed.

<Step S17>

Subsequently, the control section (40) performs a process of driving and controlling the ink curing and drying device (323) to emit actinic radiation to the paper on which the image is recorded.

<Step S27>

Subsequently, the control section (40) performs control to deliver the paper which is supported on the temperature controlling recording drum (321) and which is subjected to the actinic radiation emission process, to the drum (411), and to deliver the paper sequentially from the drum (411) to the drum (412) and from the drum (412) to the discharging chain (415) driven by the plurality of gears (413).

With this control, the paper on which the full-color images of the Y, M, C, and K inks are recorded is conveyed to the discharging section (420) and placed on the discharge tray (431).

Then, after that, the drum rotation is stopped, and the process is ended.

<Step S14>→<Step S18>

On the other hand, when the double-sided image recording job is executed, the control section (40) sets the conveyance path to the reversing mechanism (330).

<Step S19>

Subsequently, the control section (40) performs an image recording process in the same manner as in the above-described <step S16>.

<Step S20>

The control section (40) drives and controls the ink-curing/drying device (323) to emit actinic radiation to the paper on which the images are recorded in the same manner as in the above-described <step S17>.

<Step S21>

After that, the control section (40) performs a process of reversing the paper after emitting actinic radiation to the paper.

That is, the control section (40) performs control to deliver one end (front end in the conveyance direction) of the paper supported on the temperature controlling recording drum (321) from one of the claw sections (321*a*) of the temperature controlling recording drum (321) to the claw sections (331*a*) of the first reversing drum (331).

Then, the control section (40) controls the independent drive motor at a predetermined rate corresponding to the length of the recording medium (P) in the conveyance direction so that the front end of the paper in the conveyance direction held by the claw section (331*a*) of the first reversing drum (331) included in the reversing mechanism (330) in FIG. 1 passes the position F facing the second reversing drum (332), and then the rear end of the paper in the conveyance direction reaches the position F at a timing when the claw section (332*a*) of the second reversing drum reaches the position F.

The claw section (332*a*) of the second reversing drum (332) receives the end of the recording medium (P) by being caused to close the clows that has been opened, owing to the camming mechanism (not shown) at a timing passing the position F.

Thereafter, the claw section (331*a*) of the first reversing drum (331) opens the claws owing to the camming mechanism (not shown) at a predetermined position and opens the front end of the recording medium (P), whereby the recording medium (P) is delivered from the first reversing drum (331) to the second reversing drum (332) with the conveyance direction reversed.

<Step S22>

The control section (40) performs control for controlling the temperature of the temperature controlling conveyance drum (313) with the heater H1 and another temperature controlling member, referring to the detected temperature of the temperature sensors, and conveys the paper from the reversing mechanism (330) to the conveyance mechanism (310).

According to the above-described S21, the paper conveyance direction is reversed, and thereafter, the paper is delivered from the second reversing drum (332) to the temperature controlling conveyance drum (313) while the front and back surfaces of the paper, and the front and rear ends of the paper in the conveyance direction are reversed, compared with when printing on the front surface of the paper.

<Step S23>

Subsequently, the control section (40) performs control for controlling the temperature of the temperature controlling recording drum (321) with the heater H2 and the other temperature controlling member, referring to the detected temperature of the temperature sensors, and conveys the paper from the conveyance mechanism (310) to the recording mechanism (320).

The paper is then conveyed by the temperature controlling recording drum (321) towards the ink jet recording section (322).

<Step S24, S25 and S26>

Subsequently, the control section (40) performs control for setting the conveyance path (the above-described open/close condition of the claw sections) to the discharging mechanism (410), performs image recording on the back surface of the paper, and performs control for actinic radiation, and then proceeds to <step S27>.

<Step S27>

Thereafter, the control section (40) executes the control of discharging the paper and stopping the rotation of the drum in the same manner as described above and ends the series of processes.

Owing to the above-mentioned control, the paper having front and back surfaces thereof on which the image recording and fixing processes have been performed is conveyed to the discharging section (420) and stacked on the discharge tray (431).

Then, after that, the drum rotation is stopped, and the processes are ended.

II. Ink Jet Recording Step

The ink jet recording method according to the present invention includes a feeding step of a recording medium, a first conveying step, a first recording step, a reversing step, a second conveying step, a second recording step, and a discharging step, wherein in the feeding step, the recording medium is fed from a feeding device to a recording device, in the first conveying step, the recording medium fed by the feeding step is conveyed to a temperature controlling recording drum while being heated by a temperature controlling conveyance drum, in the first recording step, the recording medium conveyed by the first conveying step is conveyed while being heated by the temperature controlling recording drum, and ink is applied to a first surface of the recording medium so as to record an image thereon.

in the reversing step, the recording medium to the first surface of which the ink is applied is reversed, in the second conveying step, the recording medium reversed by the reversing step is conveyed to the temperature controlling recording drum while being heated by the temperature controlling conveyance drum, in the second recording step, the recording medium conveyed by the second conveying step is conveyed while being heated by the temperature controlling recording drum, and ink is applied to a second surface of the recording medium so as to record an image thereon, and in the discharging step, the recording medium to the first surface and the second surface of which the ink is applied is discharged.

Thus, the effect of the present invention is realized, and the problem can be solved. Hereinafter, each step will be described.

1. Feeding Step

In the recording medium feeding step, the recording medium is fed from the feeding device (200) to the recording device (300).

The feeding device (200) includes a feed tray (231) for storing the recording medium (P), a feeding section (220) for feeding the recording medium (P) from the feed tray (231) to the recording device (300), and a temperature sensor (m5) for measuring the temperature of the recording medium (P).

The recording medium (P) placed on the feed tray (231) is not particularly limited, and examples thereof include various kinds of coated printing paper such as plain paper from thin paper to cardboard, high-quality paper, art paper or coated paper, water-soluble paper, commercially available Japanese paper or postcard paper, plastic film, cloth, leather, and the like, but are not limited thereto, and the color of the recording medium (P) is not particularly limited.

2. First Delivering Step

In the first conveying step, the recording medium (P) fed from the feeding device (200) to the recording device is conveyed to a temperature controlling recording drum (321) while being heated by a temperature controlling conveyance drum (313).

In the above-described conveyance, one or more conveyance drums (311 and 312) other than the temperature controlling conveyance drum (313) may be used, so that degrees of freedom in designing conveyance paths are increased. Here, it is preferable from the viewpoint of suppressing temperature loss and stably controlling temperature of the recording medium that the temperature control conveyance drum (313) is provided downstream of the conveyance drums (311 and 312) in the conveyance direction.

In addition, it is preferable from the viewpoint of being able to secure enough time for temperature control and to stably control temperature that a circumferential length of the temperature controlling conveyance drum (313) is at least twice as long as a maximum length of a sheet of the recording medium (P) in the conveyance direction, so that the length of the recording medium (P) contacting the temperature controlling conveyance drum (313) is increased.

In the above temperature controlling conveyance drum (313), an openable and closable claw section (313*a*) for holding a front end of the recording medium (P) in the conveyance direction in a closed state thereof is provided, whereby the recording medium (P) is delivered, and a cam-mechanism for causing each of a plurality of claws constituting the claw section (313*a*) to be opened or closed to receive or deliver the recording medium (P) is provided.

The above-described camming mechanism causes the claw section of the temperature controlling conveyance drum (313) to perform the operation of closing the claws that have been opened, so as to receive the recording medium (P) from the conveyance drum (312) or the drum (332) included in the reversing mechanism when the recording medium (P) is delivered from the conveyance drum (312) to the temperature controlling conveyance drum (313)

In addition, the camming mechanism causes the claw section of the temperature controlling conveyance drum (313) to perform the operation of opening the claws that have been closed, so as to deliver the recording medium (P) when the recording medium (P) is delivered from the temperature controlling conveyance drum (313) to the temperature controlling recording drum (321).

At this time, for example, if a diameter of a second reversing drum (332) is set to be 1, a diameter of the temperature control conveyance drum (313) is set to be 2, and a diameter of the temperature control recording drum (321) is set to 3, the second reversing drum (332) is configured to be provided with one claw section (332*a*), the temperature control conveyance drum (313) is configured to be provided with two claw sections (313*a*) every 180°, and the temperature control recording drum (321) is configured to be provided with three claw sections (321*a*) every 120°. When the temperature control recording drum (321) rotates by 120° in the counterclockwise direction ($F_2$ direction) of FIG. 1, the second reversing drum (332) rotates by 360° in the same direction and the temperature control conveyance drum (313) rotates by 180° in the clockwise direction ($F_1$ direction), and the claw section of each drum is opened and closed at its facing position so as to achieve an interconnected operation so that the recording medium (P) is delivered and received.

Further, it is preferable from the viewpoint of improving accuracy of alignment of double-sided image recording that the claw device provided in the drum on the upstream side in the conveyance direction is opened and the claw device provided in the drum on the downstream side in the conveyance direction is closed when the recording medium is conveyed, whereby the front end of the recording medium in the conveyance direction is sequentially delivered from the drum on the upstream side in the conveyance direction to the drum on the downstream side in the conveyance direction so as to be conveyed.

The delivering positions of the recording medium (P) related to the first delivering step are two positions of the position A and the position C described above (see FIG. 1 and FIG. 2).

As shown in FIG. 1, since the position A is opposite to the position C with the temperature controlling conveyance drum (313) interposed therebetween, an amount of winding of the recording medium (P) fed from the feeding device (200) with respect to the temperature controlling conveyance drum (313) can be obtained, so that the duration of contacting with the recording medium (P) can be sufficiently ensured and the temperature of the recording medium (P) can be stably controlled.

In one embodiment, a non-contact heater (e.g., a halogen-lamp, etc.) performing infrared irradiation in the vicinity of the temperature controlling conveyance drum (313) is used to heat the temperature controlling conveyance drum (313) (as described above, a non-contact type of heater installed in the vicinity of the temperature controlling conveyance drum is simply referred to as a "heater H1").

In the vicinity of the heater H1, a temperature sensor (as described above, such a temperature sensor is referred to as a "temperature sensor (m1)") is installed at a position facing the portion along the outer peripheral surface from the position C to the position A in the rotational direction ($F_1$ direction, clockwise direction) of the temperature controlling conveyance drum (313), and temperature of the temperature controlling conveyance drum (313) is directly detected by the temperature sensor (m1) to be outputted to the control section (40) (see FIG. 1 and FIG. 2).

As a temperature detecting element of the temperature sensor (m1), a contact-type of element such as thermocouple or thermistor may be used, but a non-contact-type of element such as thermopile is more preferable.

The control section (40) controls heating operation or cooling operation of the heater H1 or other temperature controlling members based on the temperature detected by the temperature sensor (m1) so that the outer peripheral surface of the temperature controlling conveyance drum (313) has a predetermined temperature.

3. First Recording Step

In the first recording step, the recording medium conveyed by the first conveying step is conveyed while being heated by the temperature controlling recording drum, and ink is applied to a first surface of the recording medium so as to record an image thereon.

In temperature controlling recording drum (321), an openable and closable claw section (321*a*) for holding a front end of the recording medium (P) in the conveyance direction in a closed state thereof is provided, whereby the recording medium (P) is delivered, and a cam-mechanism for causing each of a plurality of claws constituting the claw section (321*a*) to be opened or closed to receive or deliver the recording medium (P) is provided. Or delivering the recording medium (P) by opening and closing a plurality of claws constituting the claw (321*a*).

The above-described camming mechanism causes the claw section of the temperature controlling recording drum (321) to perform the operation of closing the claws that have been opened, so as to receive the recording medium (P) from the temperature controlling conveyance drum (313) when the recording medium (P) is delivered from the temperature controlling conveyance drum (313) to the temperature controlling recording drum (321).

In the present Example, the temperature controlling recording drum (321) has claw sections (321*a*) arranged at three positions on the outer peripheral surface at equal intervals, and the temperature controlling recording drum (321) can hold at most three sheets of the recording medium (P).

The claw section (321*a*) of the temperature controlling recording drum is interlocked with the temperature controlling recording drum (321) rotating and is actuated by the camming mechanism (not shown) so that the claw section is opened and closed at positions facing the temperature controlling conveyance drum (313), the drum (411) included in the discharging mechanism, and the first reversing drum (331).

When ink is applied to a first surface of the recording medium (P) to record an image thereon, ink is ejected from a nozzle opening provided on an ink ejection surface facing a conveyance surface of the temperature controlling recording drum (321) to the recording medium (P) at an appropriate timing in accordance with the rotation of the ink ejection surface in which recording medium (P) is held, to apply ink to the recording medium (P).

The heads for ejecting ink are arranged such that a distance between each ink ejection surface and the conveyance surface of the temperature controlling recording drum (321) is separated by a predetermined distance, a plurality of nozzles for individually ejecting ink to the recording medium (P) conveyed on the temperature controlling recording drum (321) are provided so as to be perpendicular to the conveyance direction of the recording medium (P), and ink is ejected in an amount in accordance with a pixel value of image data based on the control of the control section (40).

Although there is no particular limitation on the ink, it is preferable from the viewpoint of being able to cure ink in a short time by actinic radiation that the ink is an actinic radiation curing type of ink, and the recording mechanism (320) includes an ink-curing and drying device (323).

Curing properties of actinic radiation curing type of ink are often susceptible to temperature, but the temperature of the temperature controlling recording drum (321) is controlled appropriately when the ink is used, and thus better and quality-stable image recording can be performed.

In addition, it is preferable from the viewpoint of performing good and quality-stable image recording that the ink is phase changing ink, and the phase change occurs before and after the ink is recorded on the recording medium (P).

When the ink has a property of changing phase with temperature, the temperature of the temperature controlling recording drum (321) is controlled appropriately, whereby the viscosity of the ink can be controlled to prevent the ink droplets ejected from the nozzle of ink jet head (322*a*, 322*b*, 322*c*, and 322*d*) from being mixed with each other, so that better and quality-stable image recording can be performed.

In the first recording step, an ink is applied to the first surface of the recording medium (P) and an image is recorded thereon, and then the ink is cured and dried.

It is preferable that the recording medium is reversed after the ink is cured and dried, thereby preventing the ink applied to the recording medium from being transferred to the first reversing drum (331) used at the time of reversal.

The ink is cured and dried, for example, by emitting actinic radiation.

For example, a LED, a high-pressure mercury lamp, and the like is used as the light source. Via emission of the LED, the lamp, and the like to the recording medium (P) supported on the temperature controlling recording drum (321), actinic radiation such as ultraviolet radiation having a wavelength corresponding to the characteristics of the polymerization initiator and the like in the ink is emitted to the ink ejected on the recording medium (P), thereby causing the ink to polymerize to be cured and fixed on the recording medium (P).

The actinic radiation may be energy radiation other than ultraviolet radiation having a property of curing the ink in accordance with the properties of the ink, such as infrared radiation, electron radiation, and other energy radiation.

The light source is not limited to a LED or a high-pressure mercury lamp but may be a mercury lamp having an operating pressure of several hundred [Pa] to 1 mega [Pa], a light source that can be used as a sterilizing lamp, a cold-cathode tube, an ultraviolet laser light source, a metal halide lamp, and the like. Here, a light source which can emit ultraviolet radiation with high illuminance and is power-saving is desirable.

When an ink containing a solid-forming component including a colorant and a solvent component is used, the ink curing/drying device (323) may be a drying device that evaporates the solvent component, which is preferable from the viewpoint of being able to fix the ink on the recording medium.

Examples of the drying device include a non-contact type of drying device such as an infra-red heater or a hot air blower.

In one embodiment, after the recording medium is delivered from the temperature controlling conveyance drum (313) to the temperature controlling recording drum (321), and before ink is applied to the first surface of the recording medium (P) to record an image thereon, temperature of the recording medium (P) is controlled by a heater H3 installed in the vicinity of the temperature controlling recording drum (321), and then is sensed by a temperature sensor (m3) to be outputted to the control section (40).

The heater H3 operates under the control of the control section (40) and radiates heat for directly heating the recording medium (P) supported to the temperature controlling recording drum (321), thereby heating the recording medium (P) from the recording surface.

The "recording surface" as described above refers to a surface of the recording medium (P) to which ink is applied by the aforementioned ink-jet recording section at the time when the temperature controlling recording drum (320) conveys the recording medium (P).

The temperature sensor (m3) can also detect temperature of the temperature controlling recording drum (321) when the recording medium (P) is not passing.

In one embodiment, after ink is applied to the first surface of the recording medium (P) to record an image thereon, temperature of the recording medium (P) is sensed by a temperature sensor (m4) installed in the vicinity of the temperature controlling recording drum (321) to be outputted to the control section (40).

Then, the ink is cured and dried by the ink curing and drying device (323).

The temperature sensor (m4) can also detect temperature of the temperature controlling recording drum (321) when the recording medium (P) is not passing.

The delivering positions of the recording medium (P) related to the first recording step are two positions of the position C and the position E described above (see FIG. 1 and FIG. 2).

4. Reversing Step

In the reversing step, the recording medium to the first surface of which the ink is applied is reversed, The first reversing drum (331) used in the reversing step separates the recording medium (P) from the temperature controlling recording drum (321) by receiving the recording medium (P) from the temperature controlling recording drum (321), for example, at the position E, due to the function of reversing the front and back surfaces of the recording medium (P).

In one embodiment, the front and back surfaces of the recording medium (P) are then reversed when passing from the first reversing drum (331) to the second reversing drum (332).

At this time, the first reversing drum (331) as described above has a diameter which is approximately twice as long as that of the second reversing drum (332), and the first reversing drum (331) is rotated by a motor (hereinafter referred to as an "independent drive motor") (not shown) which is an independent drive source to be described later.

The first reversing drum (331) included in the reversing mechanism is a drum that once separates the recording medium (P) from the temperature controlling recording drum (321) and delivers the rear end of the recording medium (P) to the second reversing drum, but the driving source is different from the other drums such as the temperature controlling conveyance drum (313) and the temperature controlling recording drum (321), and is controlled by an independent driving source, which makes it possible to reverse a conveyance direction in which the rear end of the recording medium having a different length is delivered to the second reversing drum.

As described above, in order to reverse the recording medium (P), the front and back surfaces of the recording medium (P) may be reversed when the recording medium (P) is delivered from the first reversing drum (331) to the conveyance drum (312) used in the second conveying step without using the second reversing drum (332), but it is more preferable from the viewpoint of suppressing temperature loss and stably controlling temperature of the recording medium that the recording medium (P) is directly delivered to the temperature controlling conveyance drum (313) because the conveyance path is shortened.

A position E is a position where the recording medium (P) is directly delivered from the temperature controlling recording drum (321) to the first reversing drum (331).

The reverse of the recording medium (P) is performed when the first reversing drum (331) is delivered to the second reverse drum (332), and the first reversing drum (331) is provided with an openable and closable claw section (331*a*) that holds the front end of the recording medium (P) in a closed state, whereby the recording medium (P) is delivered, and a cam-mechanism for causing each of a plurality of claws constituting the claw section (331*a*) to be opened or closed to receive or deliver the recording medium (P) is provided.

The above-described camming mechanism causes the claw section of the first reversing drum (331) to close claws that have been opened to perform an operation of receiving the recording medium (P) from the temperature controlling recording drum (321) when the recording medium (P) is delivered from the temperature controlling recording drum (321) to the first reversing drum (331).

In addition, it is preferable from the viewpoint of being able to reverse recording mediums whose lengths are different that the first reversing drum (331) and the second reversing drum (332) used in reversing include a drum which rotates at the same speed as a linear speed of a recording medium loading surface of each of drums (311, 312, or 313) used in the second conveying step and the temperature controlling recording drum (321) and a drum which rotates at a different speed from the linear speed of the recording medium loading surface of each of the drums (311, 312, or 313) included in the conveyance mechanism and the temperature controlling recording drum (321).

The first reversing drum (331) has a claw section (331*a*) that having the same construction for pinching one end of the recording medium (P) as that of the claw section (321*a*) of the temperature controlling recording drum (321), has a diameter which is approximately twice as long as that of the second reversing drum (332), and is rotated by an independent drive motor that is a drive source independent of the aforementioned the temperature controlling recording drum (321), the drum (332) described below and the like.

The second reversing drum (332) includes an openable and closable claw section (332*a*) for holding a front end of the recording medium (P) in the conveyance direction in a closed state thereof, and a cam-mechanism for causing each of a plurality of claws constituting the claw section (332*a*) to be opened or closed to receive or deliver the recording medium (P) is provided in the second reversing drum (332).

In order to deliver the recording medium (P) from the first reversing drum (331) to the second reversing drum (332), the control section (40) controls the independent drive motor at a predetermined rate corresponding to the length of the recording medium (P) in the conveyance direction such that, after the claw section (331*a*) of the first reversing drum that conveys the recording medium (P) passes the proximate facing position F to the second reversing drum (332), the rear end of the recording medium (P) (the end not sandwiched by the claw section (331*a*) of the first reversing drum (331)) reaches the position F at a timing when the claw section (332*a*) of the second reversing drum reaches the position F.

The claw section (332*a*) of the second reversing drum receives the end of the recording medium (P) by closing the claws that have been opened at the timing of passing the position F owing to the camming device.

Thereafter, the claw section (331*a*) of the first reversing drum (331) opens the claws at a predetermined position owing to a camming mechanism (not shown) to release the recording medium (P), whereby the recording medium (P) is delivered from the first reversing drum (331) to the second reversing drum (332) while the conveyance direction is reversed.

Further, the claw section (332*a*) of the second reversing drum is, while holding the end of the recording medium (P), rotated to a position B which is the proximate facing position F to the temperature controlling conveyance drum (313), and then the claw section (332*a*) of the second reversing drum opens the claws owing to a cam mechanism (not shown) to release the end of the recording medium (P), and at the same time, the claw section (313*a*) of the temperature controlling conveyance drum (313) that has reached the position B closes the clows owing to a cam mechanism (not shown). whereby delivering the recording medium (P) from the second reversing drum (332) to the temperature controlling conveyance drum (313) is performed.

5. Second Delivering Step

In the second conveying step, the recording medium reversed by the reversing step is conveyed to the temperature controlling recording drum while being heated by the temperature controlling conveyance drum.

In the above-described conveyance, similarly to the first conveyance step described above, the conveyance drums (311 and 312) other than the temperature controlling conveyance drum (313) may be used, which increases the degree of flexibility in designing the conveyance path, and at this time, it is preferable to provide the temperature control conveyance drum (313) downstream of the conveyance drums (311 and 312) in the conveyance direction from the viewpoint of suppressing temperature loss and stably controlling temperature of the recording medium (P).

Note that, for example, a position B is a position where the recording medium (P) is directly delivered from the second reversing drum (332) in the reversing step to the temperature controlling conveyance drum (313) in the second conveying step, but when the second reversing drum (332) is not used in the reversing step, a position where the recording medium (P) is delivered from the first reversing drum (331) to the conveyance drum (312) in the conveying step is not included in the definition of the position B.

The claw section (313*a*) of the temperature controlling conveyance drum (313), the cam-mechanism and the interlocking operation thereof, the heater H1 and the temperature-sensor (m1) installed in the vicinity of the temperature controlling conveyance drum (313), and the like in the second delivering step are the same as those in the first delivering step.

The delivering positions of the recording medium (P) related to the second delivering step are two positions of the position B and the position C described above (see FIG. 1 and FIG. 2).

6. Second Recording Step

In the second recording step, the recording medium conveyed by the second conveying step is conveyed while being heated by the temperature controlling recording drum, and ink is applied to a second surface of the recording medium so as to record an image thereon.

In the second recording step, the claw section (321*a*) of the temperature controlling recording drum (321), the cam mechanism and the interlocking operation thereof, the arrangement of the heads that eject ink, and the like, the ink curing/drying device (323), the type of the ink, the heater H3 and the temperature sensor (m3) and the temperature sensor (m4) installed in the vicinity of the temperature controlling recording drum (321), and the like are the same as those in the first recording step.

The delivering positions of the recording medium (P) related to the second recording step are two positions of the position C and the position D described above (see FIG. 1 and FIG. 2).

7. Discharging Process

In the discharging step, the recording medium to the first surface and the second surface of which the ink is applied is discharged.

In the discharging step, a discharging device (400) is used, and the recording medium to the first surface and the second surface of which ink is applied is discharged by the discharging device (400).

The delivering position of the recording medium (P) related to the discharge process is the above-described position D (see FIG. 1 and FIG. 2).

The drum (411) of the discharging mechanism is provided with one claw section (411*a*) that sandwiches one end of the recording medium (P) with the same configuration as the claw sections (321*a*) of the temperature controlling recording drum (321).

Provided is a cam mechanism which causes a plurality of claws constituting the claw section (321*a*) of the temperature controlling recording drum (321) and the claw section (411*a*) of the drum (411) to open and close to receive or deliver the recording medium (P) when the claw section (321*a*) of the temperature controlling recording drum and the claw section (411*a*) of the drum (411) are in the delivering position D from the temperature controlling recording drum (321) to the discharging mechanism (410).

The cam mechanism can switch whether the recording medium (P) is discharged or reversed owing to the control section (40).

Similar to the drum (411), the drum (412) is also provided with a claw section (412*a*), and the discharging chain (415) is also provided with claw sections (415*a*) at a distance of ½ of the circumferential length of the drum (411) and the drum (412), and cam mechanisms which cause a plurality of claws constituting the respective claw sections to open and close at positions where they face each other, are provided.

The recording medium (P) is delivered from the drum (411) to the discharging chain (415) via drum (412), and at the position of the discharge portion (420), the claws of the claw section (not shown) of the discharging chain (415) are opened by a cam mechanism for opening and closing the claws, and the recording medium (P) is placed on the discharge tray (431) that is plate-shaped, to be stored until the recording medium (P) is taken out by a user.

According to the aforementioned means of the present invention, it is possible to provide an ink jet recording system and a recording method capable of preventing enlargement of an apparatus, suppressing an increase in the number of components, and suppressing power consumption of a heater.

The expression mechanism or the action mechanism of the effect of the present invention is presumed as follows.

An ink jet recording section according to the present invention includes a feeding device of a recording medium, a recording device, and a discharging device.

An image is recorded on the recording medium by applying, in the recording device, ink to one surface of the recording medium fed to the recording device by the feeding device to the recording medium.

In addition, when ink is applied to not just one surface but both surfaces of the recording medium, the recording medium is reversed in the recording device.

After image recording is completed, the recording medium is discharged by the discharging device.

The recording device includes a conveyance mechanism, a recording mechanism and a reversing mechanism, and temperatures of both surfaces of the recording medium is controlled mainly by a drum for controlling temperature (also referred to as a "temperature controlling conveyance drum") provided in the conveyance mechanism and a drum for controlling temperature (also referred to as a "temperature controlling recording drum") provided in the recording mechanism.

As described above, in the prior art, in particular, various contrivances have been made so that temperature of the recording medium does not deviate from a target temperature at the time of recording images on both surfaces of the recording medium, but in the present invention, by controlling temperature of both surfaces of the recording medium by using mainly two drums of the temperature controlling conveyance drum and the temperature controlling recording drum, it is possible to design a system to minimize the number of members each having a temperature controlling function as much as possible, whereby it is possible to prevent enlargement of an apparatus, suppress an increase in the number of components, and suppress the power consumed by the heater.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An ink jet recording system comprising a feeding device of a recording medium, a recording device, a discharging device and first and second hardware processors, wherein the recording device includes a conveyance mechanism, a recording mechanism and a reversing mechanism, the discharging device includes a discharging mechanism, the conveyance mechanism includes a temperature controlling conveyance drum that conveys the recording medium to the recording mechanism while controlling temperature of the recording medium, the recording mechanism includes a temperature controlling recording drum that conveys the recording medium conveyed from the conveyance mechanism, and a process section that applies ink to one surface of the recording medium so as to record an image thereon, the first hardware processor controls the reversing mechanism to reverse the recording medium to the one surface of which the ink is applied and then delivers the recording medium to the conveyance mechanism, and wherein there is provided the discharging mechanism upstream of the reversing mechanism in a conveyance direction of the recording medium, and the second hardware processor controls to switch conveyance paths and to determine whether the recording medium to which the ink is applied is conveyed to the discharging mechanism or the reversing mechanism, each of the conveyance mechanism, the recording mechanism, and the reversing mechanism includes a plurality of openable and closable claw devices for holding a front end of the recording medium in the conveyance direction in a closed state thereof in a drum included in each of the conveyance mechanism, the recording mechanism, and the reversing mechanism, and at least during a period from application of ink to one surface of the recording medium to application of ink to the other surface of the recording medium by the recording mechanism, the claw device provided in the drum on the upstream side in the conveyance direction is opened and the claw device provided in the drum on the downstream side in the conveyance direction is closed when the recording medium is conveyed in three conveyance paths (1), (2) and (3) described below, whereby the front end of the recording medium in the conveyance direction is sequentially delivered from the drum on the upstream side in the conveyance direction to the drum on the downstream side in the conveyance direction so as to be conveyed, conveyance path (1): Path for conveying the recording medium from the recording mechanism to the reversing mechanism, conveyance path (2): Path for conveying the recording medium from the reversing mechanism to the conveyance mechanism, conveyance path (3): Path for conveying the recording medium from the conveyance mechanism to the recording mechanism, and the reversing mechanism includes a drum which rotates at the same speed as a linear speed of a recording medium loading surface of each of a drum included in the conveyance mechanism and the temperature controlling recording drum, and a drum which rotates at a different speed from the linear speed of the recording medium loading surface of each of the drum included in the conveyance mechanism and the temperature controlling recording drum.

2. The ink jet recording system according to claim 1, wherein the conveyance mechanism includes one or more conveyance drums other than the temperature controlling conveyance drum, and the temperature control conveyance drum downstream of the one or more conveyance drums in the conveyance direction.

3. The ink jet recording system according to claim 1, the recording medium reversed by the reversing mechanism is directly delivered to the temperature controlling conveyance drum.

4. The ink jet recording system according to claim 3, wherein a location in the conveyance mechanism where the recording medium is directly delivered from the one or more conveyance drums other than the temperature controlling conveyance drum to the temperature controlling conveyance drum or the recording medium is directly delivered from the feeding device to the temperature controlling conveyance drum is defined as a position A, a location in the conveyance mechanism where the recording medium is directly delivered from a drum included in the reversing mechanism to the temperature controlling conveyance drum when the recording medium is delivered from the reversing mechanism to the conveyance mechanism is defined as a position B, a location in the conveyance mechanism where the recording medium is directly delivered from the temperature controlling conveyance drum to the temperature controlling recording drum is defined as a position C, and the position B and the position C are located downstream of the position A in the conveyance direction, and the position B is between the position A and the position C.

5. The ink jet recording system according to claim 1, wherein thermal conductivity of material used for a portion of a drum included in the reversing mechanism with which the recording medium has contact is smaller than thermal conductivity of material used for a portion of the temperature controlling recording drum with which the recording medium has contact.

6. The ink jet recording system according to claim 1, wherein the ink is an actinic radiation curing type of ink, and the recording mechanism includes an ink-curing and drying device.

7. The ink jet recording system according to claim 6, wherein the recording mechanism includes the ink-curing and drying device facing the recording medium conveyed by the temperature controlling recording drum, and curing and drying of the ink by the ink curing and drying device is performed at a position upstream of the position at which the conveyance paths are switched, in the conveyance direction.

8. The ink jet recording system according to claim 1, wherein the ink includes a solid component having a colorant and a solvent component, and the recording mechanism includes a drying device for evaporating the solvent component.

9. The ink jet recording system according to claim 8, wherein the recording mechanism includes the drying device facing the recording medium conveyed by the temperature controlling recording drum, and evaporation of the solvent component by the drying device is performed at a position upstream of the position at which the conveyance paths are switched, in the conveyance direction.

10. The ink jet recording system according to claim 1, wherein the ink is phase changing ink, and the phase change occurs before and after the ink is recorded on the recording medium.

11. The ink jet recording system according to claim 1, wherein a circumferential length of the temperature controlling conveyance drum is at least twice as long as a maximum length of a sheet of the recording medium in the conveyance direction.

12. An ink jet recording method, utilizing a feeding device of a recording medium, a recording device, a discharging device and first and second hardware processors, the method comprising:

a feeding operation of the recording medium, a first conveying operation, a first recording operation, a reversing operation, a second conveying operation, a second recording operation, and a discharging operation, wherein in the feeding operation, the recording medium is fed from a feeding device to the recording device, in the first conveying operation, the recording medium fed by the feeding operation is conveyed to a temperature controlling recording drum while being heated by a temperature controlling conveyance drum, in the first recording operation, the recording medium conveyed by the first conveying operation is conveyed while being heated by the temperature controlling recording drum, and ink is applied to a first surface of the recording medium so as to record an image thereon, in the reversing operation, the recording medium to the first surface of which the ink is applied is reversed, in the second conveying operation, the recording medium reversed by the reversing operation is conveyed to the temperature controlling recording drum while being heated by the temperature controlling conveyance drum, in the second recording operation, the recording medium conveyed by the second conveying operation is conveyed while being heated by the temperature controlling recording drum, and ink is applied to a second surface of the recording medium so as to record an image thereon, and in the discharging operation, the recording medium to the first surface and the second surface of which the ink is applied is discharged, the recording device includes a conveyance mechanism, a recording mechanism and a reversing mechanism, the discharging device includes a discharging mechanism, the conveyance mechanism includes a temperature controlling conveyance drum that conveys the recording medium to the recording mechanism while controlling temperature of the recording medium, the recording mechanism includes a temperature controlling recording drum that conveys the recording medium conveyed from the conveyance mechanism, and a process section that applies ink to one surface of the recording medium so as to record an image thereon, the first hardware processor controls the reversing mechanism to reverse the recording medium to the one surface of which the ink is applied and then delivers the recording medium to the conveyance mechanism, and wherein there is provided the discharging mechanism upstream of the reversing mechanism in a conveyance direction of the recording medium, and the second hardware processor controls to switch conveyance paths and to determine whether the recording medium to which the ink is applied is conveyed to the discharging mechanism or the reversing mechanism, each of the conveyance mechanism, the recording mechanism, and the reversing mechanism includes a plurality of openable and closable claw devices for holding a front end of the recording medium in the conveyance direction in a closed state thereof in a drum included in each of the conveyance mechanism, the recording mechanism, and the reversing mechanism, and at least during a period from application of ink to one surface of the recording medium to application of ink to the other surface of the recording medium by the recording mechanism, the claw device provided in the drum on the upstream side in the conveyance direction is opened and the claw device provided in the drum on the downstream side in the conveyance direction is closed when the recording medium is conveyed in three conveyance paths (1), (2) and (3) described below, whereby the front end of the recording medium in the conveyance direction is sequentially delivered from the drum on the upstream side in the conveyance direction to the drum on the downstream side in the conveyance direction so as to be conveyed, conveyance path (1): Path for conveying the recording medium from the recording mechanism to the reversing mechanism, conveyance path (2): Path for conveying the recording medium from the reversing mechanism to the conveyance mechanism, conveyance path (3): Path for conveying the recording medium from the conveyance mechanism to the recording mechanism, and the reversing mechanism includes a drum which rotates at the same speed as a linear speed of a recording medium loading surface of each of a drum included in the conveyance mechanism and the temperature controlling recording drum, and a drum which rotates at a different speed from the linear speed of the recording medium loading surface of each of the drum included in the conveyance mechanism and the temperature controlling recording drum.

* * * * *